United States Patent
Okada et al.

(10) Patent No.: US 10,756,651 B2
(45) Date of Patent: Aug. 25, 2020

(54) POWER GENERATING ELEMENT AND POWER GENERATING DEVICE

(71) Applicant: TRI-FORCE MANAGEMENT CORPORATION, Saitama (JP)

(72) Inventors: Kazuhiro Okada, Saitama (JP); Miho Okada, Saitama (JP)

(73) Assignee: TRI-FORCE MANAGEMENT CORPORATION, Saitama (JP)

( * ) Notice: Subject to any disclaimer, the term of this patent is extended or adjusted under 35 U.S.C. 154(b) by 241 days.

(21) Appl. No.: 15/891,858

(22) Filed: Feb. 8, 2018

(65) Prior Publication Data

US 2018/0294746 A1 Oct. 11, 2018

(30) Foreign Application Priority Data

Feb. 9, 2017 (JP) .................................. 2017-022388

(51) Int. Cl.
    *H02N 1/08* (2006.01)
(52) U.S. Cl.
    CPC ..................................... *H02N 1/08* (2013.01)
(58) Field of Classification Search
    CPC ............................. H02N 1/08; H02N 1/00–12
    USPC .................................................. 310/300, 309
    See application file for complete search history.

(56) References Cited

U.S. PATENT DOCUMENTS

| | | | | |
|---|---|---|---|---|
| 2004/0207369 A1* | 10/2004 | Landolt | .................... | H01G 7/02 320/166 |
| 2008/0238244 A1* | 10/2008 | Chaillout | ................. | H02N 1/08 310/308 |
| 2012/0043851 A1* | 2/2012 | Sano | ........................ | H02N 1/08 310/300 |
| 2013/0057110 A1* | 3/2013 | Aoyagi | ..................... | H02N 1/08 310/300 |
| 2013/0241346 A1* | 9/2013 | Boisseau | .................. | H02N 1/08 310/300 |

(Continued)

FOREIGN PATENT DOCUMENTS

| CN | 105978395 A | 9/2016 |
|---|---|---|
| JP | 2008-086190 A | 4/2008 |

(Continued)

OTHER PUBLICATIONS

Machine Translation, Yamakawa, JP-2013198314-A, Sep. 2013. (Year: 2013).*

(Continued)

*Primary Examiner* — Thomas Truong
(74) *Attorney, Agent, or Firm* — Ladas & Parry LLP

(57) ABSTRACT

Provided is a power generating element and a power generating device capable of using vibration energy not used for power generation in the past. The power generating element includes a displacement member, a fixed member, and an elastic deformation body. An electret material layer is formed on a surface of one of the displacement member and the fixed member. A counter electrode layer opposed to the electret material layer is formed on the other surface. When vibration energy is given to the power generating element, the displacement member is displaced with respect to the fixed member such that an inter-layer distance between the electret material layer and the counter electrode layer fluctuates according to deformation of the elastic deformation body.

15 Claims, 21 Drawing Sheets

(56) References Cited

U.S. PATENT DOCUMENTS

2014/0339954 A1 11/2014 Yamakawa et al.
2015/0349667 A1* 12/2015 Andosca ............... H02N 2/188
  310/319
2017/0373611 A1* 12/2017 Cottone ............... B81B 3/0021

FOREIGN PATENT DOCUMENTS

| JP | 2011-045194 A |   | 3/2011  |
|----|---------------|---|---------|
| JP | 2012-95422 A  |   | 5/2012  |
| JP | 2013-198314 A |   | 9/2013  |
| JP | 2013198314 A  | * | 9/2013  |
| JP | 2014-226003 A |   | 12/2014 |
| JP | 2014-230397 A |   | 12/2014 |
| JP | 2016-129485 A |   | 7/2016  |

OTHER PUBLICATIONS

J-PlatPat English translation of JP 2013-198314 A.
J-PlatPat English translation of JP 2016-129485 A.
First Chinese Office Action with English translation dated Feb. 19, 2019 for Application No. CN 201810131403.8.
Japanese Office Action issued on Mar. 17, 2020 in connection with corresponding Japanese Patent Appln. No. 2018-077749.
Japanese Office Action dated Jun. 16, 2020 issued in connection with corresponding Japanese Patent Application No. JP 2018-077749.

* cited by examiner

POWER GENERATING ELEMENT AND POWER GENERATING DEVICE

BACKGROUND OF THE INVENTION

Field of the Invention

The present invention relates to a power generating element and, more particularly, to a power generating element that performs power generation by an electret and a power generating device in which the power generating element is used.

Background Art

There has been conventionally known a power generating element that converts vibration energy into electric energy. Japanese Patent Application Laid-Open No. 2008-86190 (Patent Literature 1) and Japanese Patent Application Laid-Open No. 2011-45194 (Patent Literature 2) describe a power generating element including a first electrode configured from an electret material and a second electrode configured from metal. The electret material is a dielectric in which dielectric polarization remains even if an electric field is eliminated as in magnetic polarization of a permanent magnet.

In the power generating element described in Patent Literature 1, the first electrode or the second electrode elastically moves in an XY plane. In the power generating element described in Patent Literature 2, the first electrode or the second electrode elastically moves in an X-axis direction. A charge amount of the second electrode changes according to the elastic movement, whereby electric energy is extracted to the outside from the power generating element.

However, in Patent Literatures 1 and 2, the electrode (the first electrode or the second electrode) of the power generating element can elastically move only in a predetermined direction or in a predetermined plane. Therefore, power generation efficiency is disadvantageously low.

SUMMARY OF THE INVENTION

Therefore, an object of the present invention is to provide a power generating element and a power generating device capable of using vibration energy not used for power generation in the past.

A power generating element according to the present invention is a power generating element including: a displacement member; a fixed member; and an elastic deformation body. An electret material layer is formed on a surface of one of the displacement member and the fixed member. A counter electrode layer opposed to the electret material layer is formed on another surface. When vibration energy is given to the power generating element, the displacement member is displaced with respect to the fixed member such that an inter-layer distance between the electret material layer and the counter electrode layer fluctuates according to deformation of the elastic deformation body.

In the power generating element, the displacement member may be configured to be capable of being displaced in at least two directions among an X axis, a Y axis, and a Z axis of an XYZ three-dimensional orthogonal coordinate system fixed with respect to the fixed member when the vibration energy is given to the power generating element.

In the power generating element, the displacement member may be configured to be capable of being displaced in all the directions of the X axis, the Y axis, and the Z axis when the vibration energy is given to the power generating element.

In the power generating element, when the XYZ three-dimensional orthogonal coordinate system is defined such that an origin is arranged in a center position of the displacement member in a state in which displacement does not occur, the displacement member may include a first displacement surface orthogonal to a positive region of the X axis, a second displacement surface orthogonal to a negative region of the X axis, a third displacement surface orthogonal to a positive region of the Y axis, and a fourth displacement surface orthogonal to a negative region of the Y axis, the fixed member may include a first fixed surface orthogonal to the positive region of the X axis and opposed to the first displacement surface, a second fixed surface orthogonal to the negative region of the X axis and opposed to the second displacement surface, a third fixed surface orthogonal to the positive region of the Y axis and opposed to the third displacement surface, and a fourth fixed surface orthogonal to the negative region of the Y axis and opposed to the fourth displacement surface, and a first electret material layer may be formed on one of the first displacement surface and the first fixed surface, a first counter electrode layer may be formed on another, a second electret material layer may be formed on one of the second displacement surface and the second fixed surface, a second counter electrode layer may be formed on another, a third electret material layer may be formed on one of the third displacement surface and the third fixed surface, a third counter electrode layer may be formed on another, a fourth electret material layer may be formed on one of the fourth displacement surface and the fourth fixed surface, and a fourth counter electrode layer may be formed on another.

In the power generating element, the displacement member may further include a fifth displacement surface orthogonal to the positive region of the Z axis and a sixth displacement surface orthogonal to the negative region of the Z axis, the fixed member may further include a fifth fixed surface orthogonal to the positive region of the Z axis and opposed to the fifth displacement surface and a sixth fixed surface orthogonal to the negative region of the Z axis and opposed to the sixth displacement surface, a fifth electret material layer may be formed on one of the fifth displacement surface and the fifth fixed surface and a fifth counter electrode layer may be formed on another, and a sixth electret material layer may be formed on one of the sixth displacement surface and the sixth fixed surface and a sixth counter electrode layer may be formed on another.

In the power generating element, displacement support points may be provided in a plurality of places in the displacement member, and the displacement support points may be respectively connected to fixed support points corresponding to the displacement support points by individual elastic deformation bodies.

In the power generating element, a partially projecting convex section may be provided in one of the displacement member and the fixed member and a concave section configured to house the convex section may be provided in another, a top surface of the convex section and a bottom surface of the concave section may be opposed to each other, the electret material layer may be formed on one of the opposed surfaces, and an end counter electrode layer may be formed on another, a left side surface of the convex section and a left side surface of the concave section may be opposed to each other, the electret material layer may be formed on one of the opposed surfaces, and a left side counter electrode layer may be formed on another, and a right side surface of the convex section and a right side surface of the concave section may be opposed to each other, the electret material layer may be formed on one of the opposed surfaces, and a right side counter electrode layer may be formed on another.

In the power generating element, the end counter electrode layer, the left side counter electrode layer, and the right side counter electrode layer may form individual electrode layers electrically independent from one another.

In the power generating element, the displacement member may be configured by a tabular structure including an upper surface and a lower surface parallel to an XY plane, and the fixed member may be configured by a frame-like structure disposed to surround the tabular structure.

In the power generating element, when the XYZ three-dimensional orthogonal coordinate system is defined such that an origin is arranged in a center position of the displacement member in a state in which displacement does not occur, the tabular structure may include a first displacement outer surface orthogonal to a positive region of the X axis, a second displacement outer surface orthogonal to a negative region of the X axis, a third displacement outer surface orthogonal to a positive region of the Y axis, and a fourth displacement outer surface orthogonal to a negative region of the Y axis, and the frame-like structure may include a first fixed inner surface orthogonal to the positive region of the X axis and opposed to the first displacement outer surface, a second fixed inner surface orthogonal to the negative region of the X axis and opposed to the second displacement outer surface, a third fixed inner surface orthogonal to the positive region of the Y axis and opposed to the third displacement outer surface, and a fourth fixed inner surface orthogonal to the negative region of the Y axis and opposed to the fourth displacement outer surface.

In the power generating element, a first displacement convex section projecting in an X-axis positive direction may be provided on the first displacement outer surface, a second displacement convex section projecting in an X-axis negative direction may be provided on the second displacement outer surface, a third displacement convex section projecting in a Y-axis positive direction may be provided on the third displacement outer surface, a fourth displacement convex section projecting in a Y-axis negative direction may be provided on the fourth displacement outer surface, a first fixed convex section projecting in the X-axis negative direction may be provided in a position opposed to the first displacement convex section on the first fixed inner surface, a second fixed convex section projecting in the X-axis positive direction may be provided in a position opposed to the second displacement convex section on the second fixed inner surface, a third fixed convex section projecting in the Y-axis negative direction may be provided in a position opposed to the third displacement convex section on the third fixed inner surface, a fourth fixed convex section projecting in the Y-axis positive direction may be provided in a position opposed to the fourth displacement convex section on the fourth fixed inner surface, a top surface of the first displacement convex section and a top surface of the first fixed convex section may be opposed to each other, a first electret material layer may be formed on one of the opposed surfaces, and a first counter electrode layer may be formed on another, a top surface of the second displacement convex section and a top surface of the second fixed convex section may be opposed to each other, a second electret material layer may be formed on one of the opposed surfaces, and a second counter electrode layer may be formed on another, a top surface of the third displacement convex section and a top surface of the third fixed convex section may be opposed to each other, a third electret material layer may be formed on one of the opposed surfaces, and a third counter electrode layer may be formed on another, and a top surface of the fourth displacement convex section and a top surface of the fourth fixed convex section may be opposed to each other, a fourth electret material layer may be formed on one of the opposed surfaces, and a fourth counter electrode layer may be formed on another.

In the power generating element, a first displacement convex section projecting in an X-axis positive direction may be provided on the first displacement outer surface, a second displacement convex section projecting in an X-axis negative direction may be provided on the second displacement outer surface, a third displacement convex section projecting in a Y-axis positive direction may be provided on the third displacement outer surface, a fourth displacement convex section projecting in a Y-axis negative direction may be provided on the fourth displacement outer surface, a first fixed concave section configured to house the first displacement convex section may be provided on the first fixed inner surface, a second fixed concave section configured to house the second displacement convex section may be provided on the second fixed inner surface, a third fixed concave section configured to house the third displacement convex section may be provided on the third fixed inner surface, a fourth fixed concave section configured to house the fourth displacement convex section may be provided on the fourth fixed inner surface, a top surface and a side surface of the first displacement convex section and a bottom surface and a side surface of the first fixed concave section may be opposed to each other, a first electret material layer may be formed on one of the opposed surfaces, and a first counter electrode layer may be formed on another, a top surface and a side surface of the second displacement convex section and a bottom surface and a side surface of the second fixed concave section may be opposed to each other, a second electret material layer may be formed on one of the opposed surfaces, and a second counter electrode layer may be formed on another, a top surface and a side surface of the third displacement convex section and a bottom surface and a side surface of the third fixed concave section may be opposed to each other, a third electret material layer may be formed on one of the opposed surfaces, and a third counter electrode layer may be formed on another, and a top surface and a side surface of the forth displacement convex section and a bottom surface and a side surface of the fourth fixed concave section may be opposed to each other, a fourth electret material layer may be formed on one of the opposed surfaces, and a fourth counter electrode layer may be formed on another.

In the power generating element, the top surface of the first displacement convex section and the bottom surface of the first fixed concave section may be opposed to each other, the first electret material layer may be formed on one of the opposed surfaces, and a first end counter electrode layer may be formed on another, a left side surface of the first displacement convex section and a left side surface of the first fixed concave section may be opposed to each other, the first electret material layer may be formed on one of the opposed surfaces, and a first left side counter electrode layer may be formed on another, a right side surface of the first displacement convex section and a right side surface of the first fixed concave section may be opposed to each other, the first electret material layer may be formed on one of the opposed surfaces, and a first right side counter electrode layer may be formed on another, the tope surface of the second displacement convex section and the bottom surface of the second fixed concave section may be opposed to each other, the second electret material layer may be formed on one of the opposed surfaces, and a second end counter electrode layer may be formed on another, a left side surface of the second displacement convex section and a left side surface of the second fixed concave section may be opposed to each other, the second electret material layer may be formed on one of the opposed surfaces, and a second left side counter electrode layer may be formed on another, a right side surface of the second displacement convex section and a right side surface of the second fixed concave section may be opposed to each other, the second electret material layer may be formed on one of the opposed surfaces, and a second right side counter electrode layer may be formed on another, the top surface of the third displacement convex section and the bottom surface of the third fixed concave section may be opposed to each other, the third electret material layer may be formed on one of the opposed surfaces, and a third end counter electrode layer may be formed on another, a left side surface of the third displacement convex section and a left side surface of the third fixed concave section may be opposed to each other, the third electret material layer may be formed on one of the opposed surfaces, and a third left side counter electrode layer may be formed on another, a right side surface of the third displacement convex section and a right side surface of the third fixed concave section may be opposed to each other, the third electret material layer may be formed on one of the opposed surfaces, and a third right side counter electrode layer may be formed on another, the top surface of the fourth displacement convex section and the bottom surface of the fourth fixed concave section may be opposed to each other, the fourth electret material layer may be formed on one of the opposed surfaces, and a fourth end counter electrode layer may be formed on another, a left side surface of the fourth displacement convex section and a left side surface of the fourth fixed concave section may be opposed to each other, the fourth electret material layer may be formed on one of the opposed surfaces, and a fourth left side counter electrode layer may be formed on another, a right side surface of the fourth displacement convex section and a right side surface of the fourth fixed concave section may be opposed to each other, the fourth electret material layer may be formed on one of the opposed surfaces, and a fourth right side counter electrode layer may be formed on another, and the first to fourth end counter electrode layers, the first to fourth left side counter electrode layers, and the first to fourth right side counter electrode layers may form individual electrode layers electrically independent from one another.

In the power generating element, a first fixed convex section projecting in an X-axis negative direction may be provided on the first fixed inner surface, a second fixed convex section projecting in an X-axis positive direction may be provided on the second fixed inner surface, a third fixed convex section projecting in a Y-axis negative direction may be provided on the third fixed inner surface, a fourth fixed convex section projecting in a Y-axis positive direction may be provided on the fourth fixed inner surface, a first displacement concave section configured to house the first fixed convex section may be provided on the first displacement outer surface, a second displacement concave section configured to house the second fixed convex section may be provided on the second displacement outer surface, a third displacement concave section configured to house the third fixed convex section may be provided on the third displacement outer surface, a fourth displacement concave section configured to house the fourth fixed convex section may be provided on the fourth displacement outer surface, the top surface and the side surface of the first fixed convex section and the bottom surface and the side surface of the first displacement concave section may be opposed to each other, a first electret material layer may be formed on one of the opposed surfaces, and a first counter electrode layer may be formed on another, the top surface and the side surface of the second fixed convex section and the bottom surface and the side surface of the second displacement concave section may be opposed to each other, a second electret material layer may be formed on one of the opposed surfaces, and a second counter electrode layer may be formed on another, the top surface and the side surface of the third fixed convex section and the bottom surface and the side surface of the third displacement concave section may be opposed to each other, a third electret material layer may be formed on one of the opposed surfaces, and a third counter electrode layer may be formed on another, and the top surface and the side surface of the fourth fixed convex section and the bottom surface and the side surface of the fourth displacement concave section may be opposed to each other, a fourth electret material layer may be formed on one of the opposed surfaces, and a fourth counter electrode layer may be formed on another.

In the power generating element, the top surface of the first fixed convex section and the bottom surface of the first displacement concave section may be opposed to each other, the first electret material layer may be formed on one of the opposed surfaces, and a first end counter electrode layer may be formed on another, a left side surface of the first fixed convex section and a left side surface of the first displacement concave section may be opposed to each other, the first electret material layer may be formed on one of the opposed surfaces, and a first left side counter electrode layer may be formed on another, a right side surface of the first fixed convex section and a right side surface of the first displacement concave section may be opposed to each other, the first electret material layer may be formed on one of the opposed surfaces, and a first right side counter electrode layer may be formed on another, the top surface of the second fixed convex section and the bottom surface of the second displacement concave section may be opposed to each other, the second electret material layer may be formed on one of the opposed surfaces, and a second end counter electrode layer may be formed on another, a left side surface of the second fixed convex section and a left side surface of the second displacement concave section may be opposed to each other, the second electret material layer may be formed on one of the opposed surfaces, and a second left side counter electrode layer may be formed on another, a right side surface of the second fixed convex section and a right side surface of the second displacement concave section may be opposed to each other, the second electret material layer may be formed on one of the opposed surfaces, and a second right side counter electrode layer may be formed on another, the top surface of the third fixed convex section and the bottom surface of the third displacement concave section may be opposed to each other, the third electret material layer may be formed on one of the opposed surfaces, and a third end counter electrode layer may be formed on another, a left side surface of the third fixed convex section and a left side surface of the third displacement concave section may be opposed to each other, the third electret material layer may be formed on one of the opposed surfaces, and a third left side counter electrode layer may be formed on another, a right side surface of the third fixed convex section and a right side surface of the third displacement concave section may be opposed to each other, the third electret material layer may be formed on one of the opposed surfaces, and a third right side counter electrode layer may be formed on another, the top surface of the fourth fixed convex section and the bottom surface of the fourth displacement concave section may be opposed to each other, the fourth electret material layer may be formed on one of the opposed surfaces, and a fourth end counter electrode layer may be formed on another, a left side surface of the fourth fixed convex section and a left side surface of the fourth displacement concave section may be opposed to each other, the fourth electret material layer may be formed on one of the opposed surfaces, and a fourth left side counter electrode layer may be formed on another, a right side surface of the fourth fixed convex section and a right side surface of the fourth displacement concave section may be opposed to each other, the fourth electret material layer may be formed on one of the opposed surfaces, and a fourth right side counter electrode layer may be formed on another, and the first to fourth end counter electrode layers, the first to fourth left side counter electrode layers, and the first to fourth right side counter electrode layers may form individual electrode layers electrically independent from one another.

In the power generating element, a stopper protrusion projecting toward the tabular structure may be provided on an inner side surface of the frame-like structure, and, in a state in which the displacement member is not displaced, a predetermined gap dimension may be secured between the stopper protrusion and the tabular structure.

In the power generating element, the fixed member may further include an upper lid body configured to cover an upper part of the tabular structure and a lower lid body configured to cover a lower part of the tabular structure, and, in a state in which the displacement member is not displaced, a predetermined gap dimension may be secured between a lower surface of the upper lid body and an upper surface of the tabular structure and a predetermined gap dimension may be secured between an upper surface of the lower lid body and a lower surface of the tabular structure.

In the power generating element, the tabular structure may further include a fifth displacement outer surface orthogonal to the positive region of the Z axis and a sixth displacement outer surface orthogonal to the negative region of the Z axis, the fixed member may further include an upper lid body configured to cover an upper part of the tabular structure and a lower lid body configured to cover a lower part of the tabular structure, a lower surface of the upper lid body may form a fifth fixed inner surface orthogonal to the positive region of the Z axis and opposed to the fifth displacement outer surface and an upper surface of the lower lid body may form a sixth fixed inner surface orthogonal to the negative region of the Z axis and opposed to the sixth displacement outer surface, and a fifth electret material layer may be formed on one of the fifth displacement outer surface and the fifth fixed inner surface, a fifth counter electrode layer may be formed on another, a sixth electret material layer may be formed on one of the sixth displacement outer surface and the sixth fixed inner surface, and a sixth counter electrode layer may be formed on another.

In the power generating element, the tabular structure may be formed in a rectangular shape, and displacement support points may be provided in four places corresponding to four vertexes of the rectangular shape, and the frame-like structure may be formed in a rectangular shape surrounding the tabular structure, fixed support points may be provided in four places near four vertexes of the rectangular shape, the displacement support points and the fixed support points correspond in a one-to-one relation, and the corresponding displacement support points and fixed support points may be respectively connected by individual elastic deformation bodies.

In the power generating element, the elastic deformation body may have thickness smaller than thickness of the tabular structure and thickness of the frame-like structure and may be configured by an elongated linear structure, one end of which is connected to a displacement support point provided in the tabular structure and another end of which is connected to a fixed support point provided in the frame-like structure.

In the power generating element, the elastic deformation body may be configured by a curved or bent elongated linear structure.

In the power generating element, a weight may be joined to an upper surface or a lower surface, or both the upper and lower surfaces of the tabular structure.

A power generating device according to the present invention includes: the power generating element, the electret material layer being formed on a surface of the displacement member or the fixed member via an electret electrode layer formed in a lower layer of the electret material layer; and a power generation circuit configured to generate electric power on the basis of a voltage generated between the counter electrode layer and the electret electrode layer.

In the present invention, when vibration energy is given to the power generating element, the elastic deformation body is deformed, whereby the displacement member is displaced with respect to the fixed member such that the inter-layer distance between the electret material layer and the counter electrode layer fluctuates. Consequently, according to the present invention, it is possible to perform power generation using vibration energy not used in the electret power generating element in the past, that is, vibration energy that causes the inter-layer distance between the electret material layer and the counter electrode layer to fluctuate.

BRIEF DESCRIPTION OF THE DRAWINGS

FIG. 12B is a sectional view taken along the X axis of FIG. 21A;

DETAILED DESCRIPTION OF THE INVENTION

Comparative Example

A power generating element according to a comparative example is explained before explanation of embodiments of the present invention.

Figure 23A:
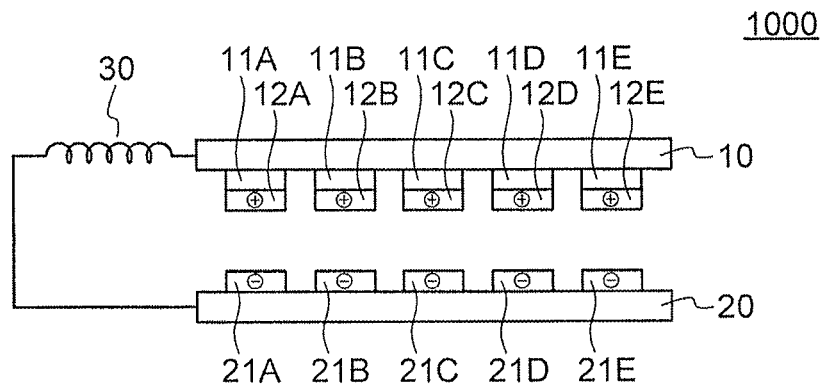
FIGS. 23A, 23B, and 23C are diagrams for explaining an operation principle of a power generating element by electret power generation in the past.

A power generating element 1000 according to a comparative example includes, as shown in FIG. 23A, a displacement member 10, a fixed member 20 fixed to a fixed table (not shown in FIG. 23A), and an elastic deformation body 30. The displacement member 10 and the fixed member 20 are disposed in parallel to each other such that the lower surface of the displacement member 10 and the upper surface of the fixed member 20 are opposed. Since the displacement member 10 and the fixed member 20 are connected by the elastic deformation body 30, the displacement member 10 is capable of elastically moving along a predetermined direction with respect to the fixed member 20.

On the lower surface of the displacement member 10, electret electrode layers 11A, 11B, 11C, 11D, and 11E configured from a conductor are formed in a stripe shape to extend in a paper surface perpendicular direction. On the electret electrode layers 11A, 11B, 11C, 11D, and 11E, electret material layers 12A, 12B, 12C, 12D, and 12E configured from an electret material are respectively formed. Positive electric charges are accumulated in the electret material layers 12A to 12E.

On the upper surface of the fixed member 20, counter electrode layers 21A, 21B, 21C, 21D, and 21E configured from a conductor are formed in a stripe shape to extend in the paper surface perpendicular direction.

The electret electrode layers 11A to 11E and the counter electrode layers 21A to 21E are respectively electrically connected to predetermined portions of a diode bridge.

The operation of the power generating element 1000 according to the comparative example is explained.

FIG. 23A shows a state in which the displacement member 10 is not displaced with respect to the fixed member 20. In this state, the electret material layers 12A, 12B, 12C, 12D, and 12E are respectively opposed to the counter electrode layers 21A, 21B, 21C, 21D, and 21E. Therefore, as shown in FIG. 23A, negative electric charges (electrons) are induced to the counter electrode layers 21A to 21E according to positive electric charges of the electret material layers 12A to 12E opposed to the counter electrode layers 21A to 21E.

Figure 23B:
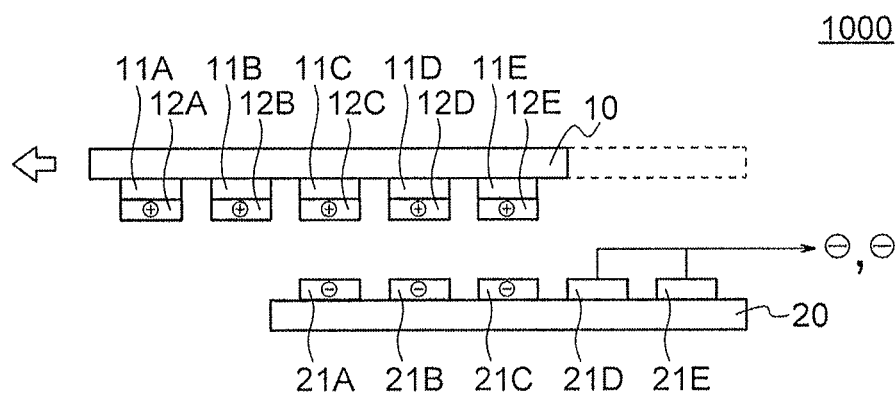

FIG. 23B shows a state in which the displacement member 10 is displaced with respect to the fixed member 20. In this state, the electret material layers 12C, 12D, and 12E are respectively opposed to the counter electrode layers 21A, 21B, and 21C. On the other hand, the electret material layers 12A and 12B and the counter electrode layers 21D and 21E have no counterparts. Therefore, as shown in FIG. 23B, negative electric charges of the counter electrode layers 21D and 21E are extracted to the outside. In this way, when the displacement member 10 is slid and displaced with respect to the fixed member 20, whereby the area of a portion where the displacement member 10 and the fixed member 20 overlap (an overlapping area) decreases, the negative electric charges are discharged to the outside of the power generating element 1000.

Figure 23C:
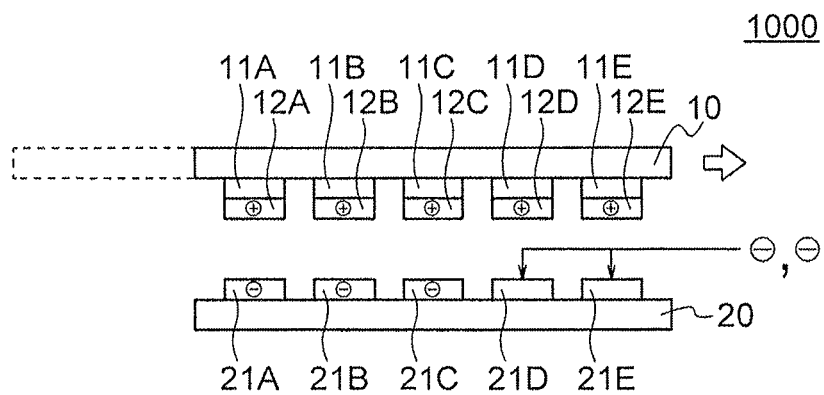

FIG. 23C shows a state in which the displacement member 10 returns to the original position. In this state, the overlapping area between the displacement member 10 and the fixed member 20 recovers to the original size. Therefore, negative electric charges are accumulated in the counter electrode layers 21D and 21E. In this way, when the overlapping area between the displacement member 10 and the fixed member 20 increases, the negative electric charges are absorbed into the inside of the power generating element 1000.

As explained above, in the power generating element 1000 according to the comparative example, since the displacement member 10 is slid and displaced with respect to the fixed member 20, the overlapping area between the displacement member 10 and the fixed member 20 increases and decreases, whereby power generation is performed.

First to tenth embodiments of the present invention are explained below.

First Embodiment

A power generating element 1 according to a first embodiment is explained.

Figure 1A:
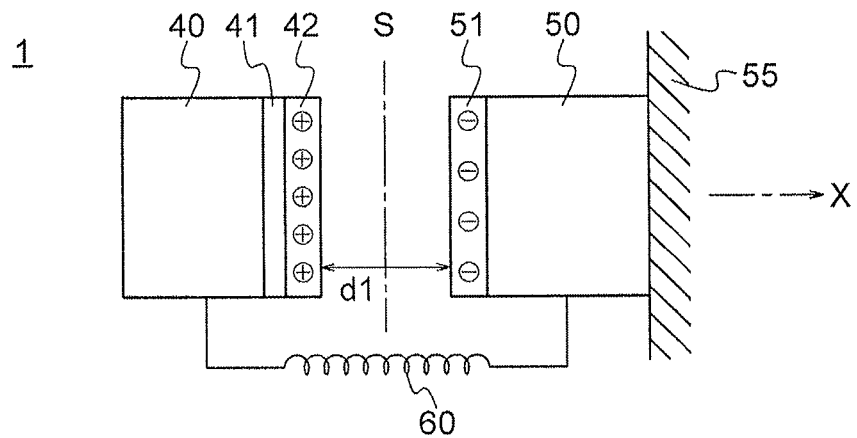
FIGS. 1A, 1B, and 1C are plan views of a power generating element according to a first embodiment of the present invention.

The power generating element 1 includes, as shown in FIG. 1A, a displacement member 40, an electret electrode layer 41, an electret material layer 42, a fixed member 50, a counter electrode layer 51, and an elastic deformation body 60.

The displacement member 40 is connected to the fixed member 50 via the elastic deformation body 60. Therefore, the displacement member 40 is capable of elastically moving in the X-axis direction with respect to the fixed member 50. In this embodiment, the displacement member 40 has a rectangular parallelepiped shape and is configured by an insulator.

The fixed member 50 is attached to an attachment surface (an attachment wall) 55. In this embodiment, the fixed member 50 has a rectangular parallelepiped shape and is configured by an insulator.

Note that the shape of the displacement member 40 and the fixed member 50 may be a shape other than the rectangular parallelepiped. The displacement member 40 and the fixed member 50 may be configured by conductors.

The electret material layer 42 is formed on the surface of the displacement member 40 via the electret electrode layer 41. That is, the electret electrode layer 41 is formed on the displacement member 40. The electret material layer 42 is formed on the electret electrode layer 41. The electret electrode layer 41 is configured from a conductor such as copper or aluminum. The electret material layer 42 is configured from an electret material. In this embodiment, the electret material layer 42 is positively charged. However, the electret material layer 42 may be negatively charged.

Note that, as the electret material configuring the electret material layer 42, a publicly-known polymeric charge retaining material or inorganic charge retaining material can be used. In the case of the polymeric charge retaining material, for example, polypropylene and polyethylene terephthalate are applicable. In the case of the inorganic charge retaining material, for example, a silicon oxide and a silicon nitride are applicable.

The counter electrode layer 51 opposed to the electret material layer 42 is formed on the surface of the fixed member 50. The counter electrode layer 51 is configured from a conductor such as copper or aluminum.

Note that an electret material layer may be formed on the fixed member 50 rather than the displacement member 40. In this case, the electret material layer is formed on the surface of the fixed member 50 via an electret electrode layer. A counter electrode layer is formed on the surface of the displacement member 40.

Generally speaking, the electret material layer is formed on the surface of one of the displacement member 40 and the fixed member 50. The counter electrode layer opposed to the electret material layer is formed on the surface of the other. The electret material layer is formed on the surface of the displacement member 40 or the fixed member 50 via the electret electrode layer formed in the lower layer of the electret material layer.

The electret material layer 42 and the counter electrode layer 51 are disposed across a predetermined reference surface. In this embodiment, as shown in FIG. 1A, the electret material layer 42 and the counter electrode layer 51 are disposed in parallel to a predetermined reference plane S. Note that the reference surface may be a curved surface. For example, when the electret material layer 42 is formed in a convex shape and the counter electrode layer 51 is formed in a concave shape that fits with the convex shape, the reference surface is a curved surface conforming to the convex shape (or the concave shape).

The operation of the power generating element 1 according to this embodiment is explained.

In the power generating element 1, the displacement member 40 is displaced in the horizontal direction (the X-axis direction) with respect to the fixed member 50 such that an inter-layer distance fluctuates. Power generation is performed according to this displacement operation. The "inter-layer distance" is the distance between the electret material layer 42 and the counter electrode layer 51 opposed to each other.

More in detail, when vibration energy such as environmental vibration is given to the power generating element 1, the elastic deformation body 60 is deformed. Consequently, the displacement member 40 is displaced with respect to the fixed member 50 such that the inter-layer distance between the electret material layer 42 and the counter electrode layer 51 fluctuates.

When the displacement member 40 is not displaced, the inter-layer distance between the electret material layer 42 and the counter electrode layer 51 is d1. In this state, as shown in FIG. 1A, negative electric charges are induced to the counter electrode layer 51 by positive electric charges accumulated in the electret material layer 42. Note that, when the electret material layer 42 is negatively charged, positive electric charges are induced to the counter electrode layer 51. In the following explanation of this specification, unless specifically noted otherwise, positive electric charges or negative electric charges induced to the counter electrode layer by electric charges of the electret material layer are collectively simply referred to as "electric charges".

Figure 1B:
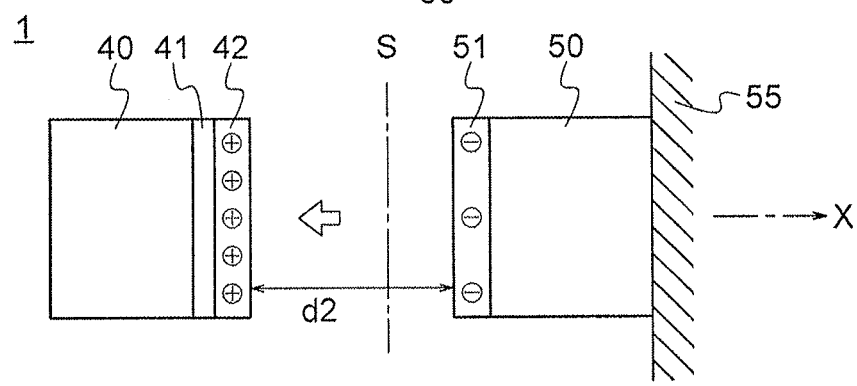
Figure 1C:
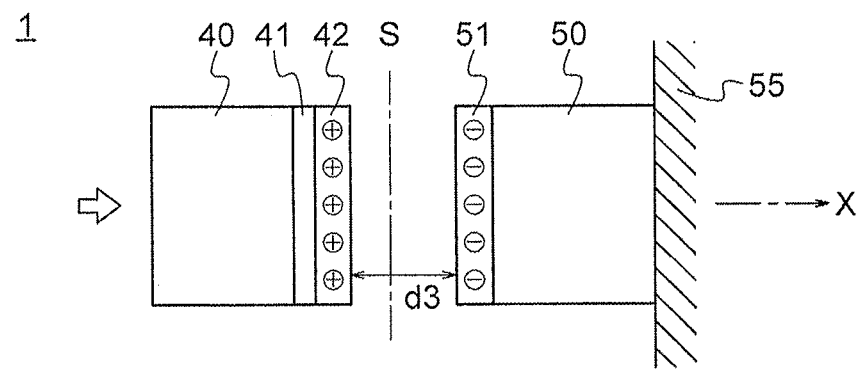

When a force in a −X-axis direction (hereinafter referred to as "X-axis negative direction" as well) acts on the displacement member 40, as shown in FIG. 1B, the displacement member 40 separates from the fixed member 50 and the inter-layer distance increases to d2 larger than d1. Consequently, the electric charges induced to the counter electrode layer 51 decrease. Conversely, when a force in a +X-axis direction (hereinafter referred to as "X-axis positive direction" as well) acts on the displacement member 40, as shown in FIG. 1C, the displacement member 40 approaches the fixed member 50 and the inter-layer distance decreases to d3 smaller than d1. Consequently, the electric charges induced to the counter electrode layer 51 increase.

In this way, the displacement member 40 is displaced in the perpendicular direction with respect to the reference plane S, whereby the power generating element 1 performs power generation.

The phenomenon explained above, that is, a phenomenon in which a charge amount induced to the counter electrode layer 51 changes according to fluctuation in the inter-layer distance between the electret material layer 42 and the counter electrode layer 51 is a phenomenon uniquely found by the inventor of this application. An increase and a decrease of electric charges were accidentally confirmed when the inter-layer distance is increased and reduced. A reason for this phenomenon is surmised to be a change in the capacitance of a capacitor configured from the electret electrode layer 41 and the counter electrode layer 51. More in detail, when the inter-layer distance increases from d1 to d2, since the capacitance of the capacitor decreases, the number of electric charges accumulated in the counter electrode layer 51 decreases. Conversely, when the inter-layer distance decreases from d1 to d3, since the capacitance of the capacitor increases, the number of electric charges accumulated in the counter electrode layer 51 increases. Consequently, it is surmised that, when the inter-layer distance is increased or reduced, the charge amount induced to the counter electrode layer 51 changes.

A power generating device 100 including the power generating element 1 is explained.

Figure 2:
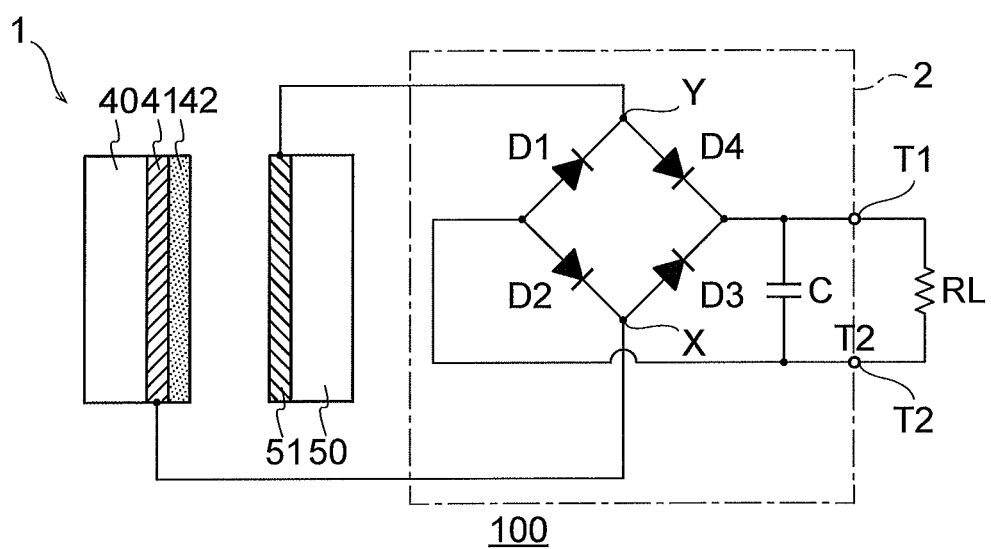
FIG. 2 is a diagram showing a schematic configuration of a power generating device including the power generating element according to the first embodiment.

The power generating device 100 includes, as shown in FIG. 2, the power generating element 1 and a power generation circuit 2. The power generation circuit 2 is configured to generate electric power on the basis of a voltage generated between the counter electrode layer 51 and the electret electrode layer 41. In this embodiment, the power generation circuit 2 includes a diode bridge configured from diodes D1, D2, D3, and D4 and a smoothing capacitor C. The power generation circuit 2 rectifies a voltage generated between the counter electrode layer 51 and the electret electrode layer 41 and generates direct-current power. The generated direct-current power is supplied to a load RL via output terminals T1 and T2.

The electret electrode layer 41 and the counter electrode layer 51 are electrically connected to the power generation circuit 2. In this embodiment, as shown in FIG. 2, the electret electrode layer 41 is electrically connected to a connection point X of a cathode of the diode D2 and an anode of the diode D3. The counter electrode layer 51 is electrically connected to a connection point Y of a cathode of the diode D1 and an anode of the diode D4.

Note that the power generation circuit 2 may generate and output not only the direct-current power but also alternating-current power. For example, the power generation circuit 2 may further include, at a post stage of the diode bridge, an inverter that converts the direct-current power into alternating-current power.

A power generating element included in the power generating device 100 is not limited to the power generating element 1 according to this embodiment and may be any one of power generating elements according to embodiments explained below.

As explained above, in the power generating element 1, the displacement member 40 is displaced with respect to the fixed member 50 such that the inter-layer distance between the electret material layer 42 and the counter electrode layer 51 fluctuates, whereby power generation is performed. Therefore, according to the first embodiment, it is possible to perform power generation using vibration energy not used in the electret power generating element in the past, that is, vibration energy that causes the inter-layer distance between the electret material layer 42 and the counter electrode layer 51 to fluctuate.

Further, as the inter-layer distance is shorter, the charge amount induced to the counter electrode layer 51 increases up to an upper limit set to a charge amount charged in the electret material layer 42. Therefore, according to the first embodiment, it is likely that a power generation amount can be increased more than a power generation amount of the power generating element 1000 according to the comparative example.

Second Embodiment

A power generating element 1A according to a second embodiment is explained. In the first embodiment, the displacement direction of the displacement member 40 is the horizontal direction (the X-axis direction). In the second embodiment, the displacement member 40 is displaced in the vertical direction (the Z-axis direction). The second embodiment is explained below centering on differences from the first embodiment.

Figure 3:
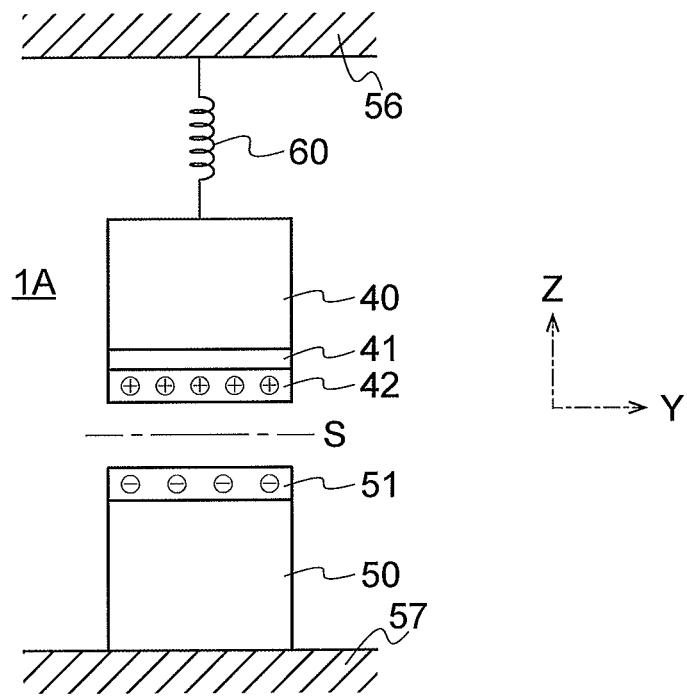
FIG. 3 is a side view of a power generating element according to a second embodiment of the present invention.

The power generating element 1A according to the second embodiment includes, as shown in FIG. 3, the displacement member 40, the electret electrode layer 41, the electret material layer 42, the fixed member 50, the counter electrode layer 51, and the elastic deformation body 60.

In this embodiment, as shown in FIG. 3, the displacement member 40 is suspended on an attachment surface (a top surface) 56 via the elastic deformation body 60. The fixed member 50 is fixed on an attachment surface 57. The displacement member 40 is displaced in the vertical direction with respect to the fixed member 50 such that an inter-layer distance fluctuates. Power generation by the same operation principle as the operation principle of the power generating element 1 (i.e., power generation based on fluctuation in the inter-layer distances) is performed according to this displacement operation.

Therefore, according to the second embodiment, it is possible to perform power generation using vibration energy not used in the electret power generating element in the past, that is, vibration energy that causes the inter-layer distance between the electret material layer 42 and the counter electrode layer 51 to fluctuate.

Further, in the power generating element 1A, the displacement member 40 is only suspended on the attachment surface 56 via the elastic deformation body 60. Therefore, the displacement member 40 can also be displaced in a direction other than the vertical direction like a pendulum. That is, in the power generating element 1A, when an XYZ three-dimensional orthogonal coordinate system fixed with respect to the fixed member 50 is defined, the displacement member 40 and the fixed member 50 can also be considered to be connected by the elastic deformation body 60 such that the displacement member 40 is capable of being displaced in all the directions of the X axis, the Y axis, and the Z axis.

Therefore, the power generating element 1A is also capable of performing the same power generation as the power generation of the power generating element 1000 according to the comparative example (i.e., the power generation based on fluctuation in the overlapping area). In this way, according to the second embodiment, it is possible to use vibration energy in all the directions. It is possible to further improve the power generation efficiency.

Third Embodiment

A power generating element 1B according to a third embodiment is explained. In the first and second embodiments, the displacement member 40 is supported by one elastic deformation body 60. In the third embodiment, the displacement member 40 is supported by a plurality of elastic deformation bodies. The third embodiment is explained below centering on differences from the first and second embodiments.

Figure 4:
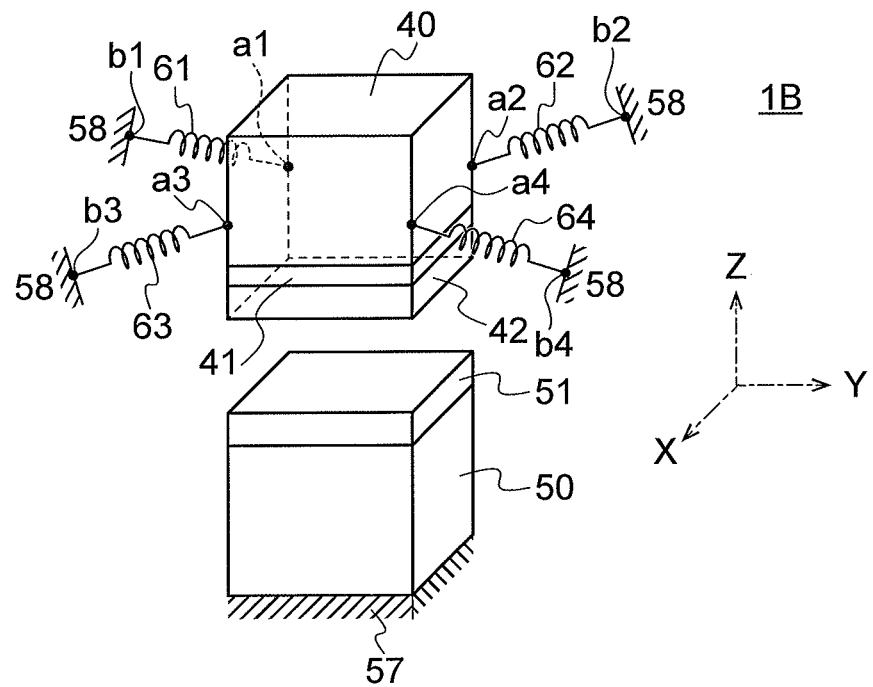
FIG. 4 is a perspective view of a power generating element according to a third embodiment of the present invention.

The power generating element 1B according to the third embodiment includes, as shown in FIG. 4, the displacement member 40, the electret electrode layer 41, the electret material layer 42, the fixed member 50, the counter electrode layer 51, and a plurality of elastic deformation bodies 61, 62, 63, and 64.

The fixed member 50 is fixed on the attachment surface 57.

As shown in FIG. 4, displacement support points a1, a2, a3, and a4 are provided in four places in the displacement member 40.

The displacement support points are connected to fixed support points corresponding to the displacement support points by elastic deformation bodies. That is, the displacement support points and the fixed support points correspond in a one-to-one relation. For example, the displacement support point a1 corresponds to a fixed support point b1 and the displacement support point a2 corresponds to a fixed support point b2. The corresponding displacement support points and fixed support points are respectively connected by individual elastic deformation bodies. That is, the displacement support point a1 and the fixed support point b1 are connected by the elastic deformation body 61. The displacement support point a2 and the fixed support point b2 are connected by the elastic deformation body 62. The displacement support point a3 and a fixed support point b3 are connected by the elastic deformation body 63. The displacement support point a4 and a fixed support point b4 are connected by the elastic deformation body 64.

As shown in FIG. 4, one ends of the elastic deformation bodies 61, 62, 63, and 64 are fixed to an attachment surface (an attachment wall) 58 and the other ends of the elastic deformation bodies 61, 62, 63, and 64 are fixed to the displacement member 40. Spring constants of the elastic deformation bodies 61 to 64 are desirably equal such that the displacement member 40 is stably supported.

As shown in FIG. 4, the elastic deformation bodies 61 to 64 are respectively connected to sides in the vertical direction of the displacement member 40 having the rectangular parallelepiped shape. Consequently, it is possible to make it easy to displace the displacement member 40 in the Z-axis direction while stably supporting the displacement member 40.

Note that the number of elastic deformation bodies is not limited to four. For example, when the displacement member 40 is an n-polygon (n: an integer equal to or larger than 3) in plan view, the displacement member 40 may be supported by n elastic deformation bodies. End portions of the elastic deformation bodies may be fixed to sides of the displacement member 40 or may be fixed to the surfaces or the vertexes of the displacement member 40.

The shape of the displacement member 40 is not limited to the rectangular parallelepiped and may be other shapes (a prism, a pyramid, a column, a cone, a sphere, an elliptical sphere, etc.).

As explained above, in the third embodiment, the displacement member 40 is connected to the attachment surface 58 by the elastic deformation bodies 61 to 64. Consequently, the displacement member 40 is capable of being displaced in all the directions of the X axis, the Y axis, and the Z axis. Therefore, as in the power generating element 1A according to the second embodiment, it is possible to perform the power generation based on fluctuation in the inter-layer distances and the overlapping areas. It is possible to further improve the power generation efficiency.

Note that this embodiment is not limited to the case in which the displacement member 40 is configured to be capable of being displaced in all the directions of the X axis, the Y axis, and the Z axis when vibration energy is given to the power generating element 1B. That is, the displacement member 40 may be configured to be capable of being displaced in two directions of the X axis and the Z axis or two directions of the Y axis and the Z axis of the XYZ three-dimensional orthogonal coordinate system.

Fourth Embodiment

A power generating element 1C according to a fourth embodiment is explained. In the first to third embodiments, the electret material layer is provided only on one surface of the displacement member 40. In the fourth embodiment, electret material layers are respectively provided on side surfaces of the displacement members 40. The fourth embodiment is explained below centering on differences from the first to third embodiments.

Figure 5:
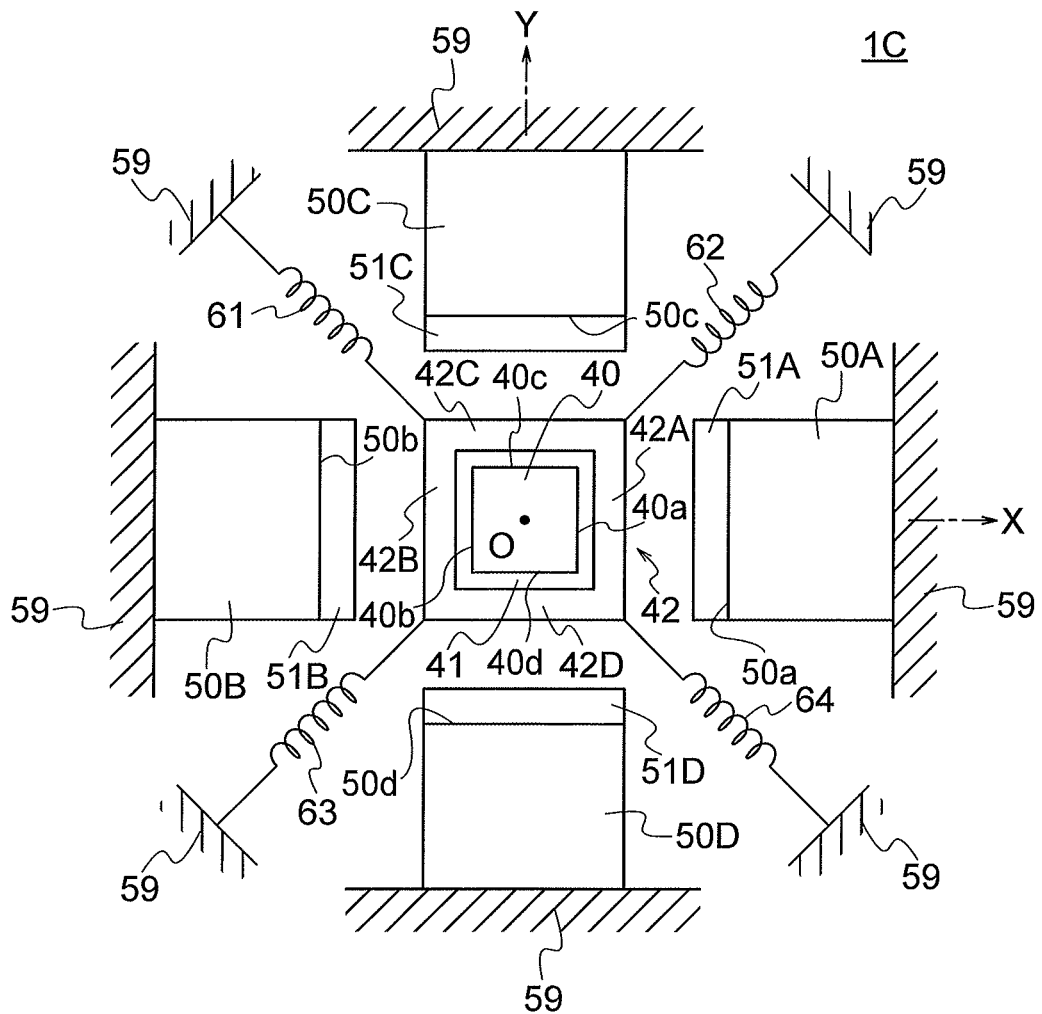
FIG. 5 is a plan view of a power generating element according to a fourth embodiment of the present invention.

The power generating element 1C according to the fourth embodiment includes, as shown in FIG. 5, the displacement member 40, the electret electrode layer 41, the electret material layer 42, the fixed member 50, the counter electrode layer 51, and the plurality of elastic deformation bodies 61, 62, 63, and 64. The electret electrode layer 41 is provided to cover the entire periphery of the displacement member 40. The electret material layer 42 includes a plurality of electret material layers 42A, 42B, 42C, and 42D. The fixed member 50 includes fixed members 50A, 50B, 50C, and 50D.

An XYZ three-dimensional orthogonal coordinate system is defined such that an origin O is arranged in the center position of the displacement member 40 in a state in which displacement does not occur.

First, the displacement member 40 in this embodiment is explained. The displacement member 40 includes, as shown in FIG. 5, a displacement surface 40a (a first displacement surface), a displacement surface 40b (a second displacement surface), a displacement surface 40c (a third displacement surface), and a displacement surface 40d (a fourth displacement surface). The displacement surface 40a is a surface orthogonal to the positive region of the X axis. The displacement surface 40b is a surface orthogonal to the negative region of the X axis. The displacement surface 40c is a surface orthogonal to the positive region of the Y axis. The displacement surface 40d is a surface orthogonal to the negative region of the Y axis.

In this embodiment, electret material layers are provided on the side surfaces of the displacement member 40. That is, as shown in FIG. 5, the electret material layers 42A to 42D are respectively provided on the side surfaces of the displacement member 40. More in detail, the electret material layer 42A is provided on the displacement surface 40a via the electret electrode layer 41. The electret material layer 42B is provided on the displacement surface 40b via the electret electrode layer 41. The electret material layer 42C is provided on the displacement surface 40c via the electret electrode layer 41. The electret material layer 42D is provided on the displacement surface 40d via the electret electrode layer 41. In this embodiment, the electret material layers 42A to 42D are positively charged. Note that the electret material layers 42A to 42D may be negatively charged.

In the fourth embodiment, as shown in FIG. 5, one ends of the elastic deformation bodies 61 to 64 are fixed to an attachment surface (an attachment wall) 59 and the other ends of the elastic deformation bodies 61 to 64 are fixed to the electret material layer 42. Consequently, as in the third embodiment, the displacement member 40 is capable of being displaced in all the directions of the X axis, the Y axis, and the Z axis.

The fixed member 50 in this embodiment is explained. The fixed member 50 includes a fixed surface 50a (a first fixed surface), a fixed surface 50b (a second fixed surface), a fixed surface 50c (a third fixed surface), and a fixed surface 50d (a fourth fixed surface). The fixed surface 50a is a surface orthogonal to the positive region of the X axis and opposed to the displacement surface 40a. The fixed surface 50b is a surface orthogonal to the negative region of the X axis and opposed to the displacement surface 40b. The fixed surface 50c is a surface orthogonal to the positive region of the Y axis and opposed to the displacement surface 40c. The fixed surface 50d is a surface orthogonal to the negative region of the Y axis and opposed to the displacement surface 40d.

As shown in FIG. 5, the fixed member 50 is configured from the fixed members 50A, 50B, 50C, and 50D separate from one another. The fixed member 50A includes the fixed surface 50a, the fixed member 50B includes the fixed surface 50b, the fixed member 50C includes the fixed surface 50c, and the fixed member 50D includes the fixed surface 50d.

Note that the fixed member 50 may be configured by one member. For example, the fixed member 50 may be configured as a frame member having a frame shape. Inner side surfaces of the frame member may be the fixed surfaces 50a to 50d (e.g., see fixed inner surfaces 80a to 80d in a fifth embodiment explained below).

The electret material layer 42A (a first electret material layer) is formed on one of the displacement surface 40a and the fixed surface 50a. A counter electrode layer 51A (a first counter electrode layer) is formed on the other. In this embodiment, the electret material layer 42A is formed on the displacement surface 40a via the electret electrode layer 41. The counter electrode layer 51A is formed on the fixed surface 50a.

On the other displacement surfaces and the fixed surfaces, similarly, electret material layers and counter electrode layers are formed. That is, the electret material layer 42B (a second electret material layer) is formed on one of the displacement surface 40b and the fixed surface 50b. A counter electrode layer 51B (a second counter electrode layer) is formed on the other. The electret material layer 42C (a third electret material layer) is formed on one of the displacement surface 40c and the fixed surface 50c. A counter electrode layer 51C (a third counter electrode layer) is formed on the other. The electret material layer 42D (a fourth electret material layer) is formed on one of the displacement surface 40d and the fixed surface 50d. A counter electrode layer 51D (a fourth counter electrode layer) is formed on the other.

The operation of the power generating element 1C according to the fourth embodiment is explained.

When a force in the +X-axis direction acts on the displacement member 40, the displacement member 40 approaches the fixed member 50A and separates from the fixed member 50B. Consequently, the inter-layer distance between the electret material layer 42A and the counter electrode layer 51A decreases and the inter-layer distance between the electret material layer 42B and a counter electrode layer 51B increases. As a result, electric charges induced to the counter electrode layer 51A increase and electric charges induced to the counter electrode layer 51B decrease.

Conversely, when a force in the −X-axis direction acts on the displacement member 40, the electric charges induced to the counter electrode layer 51A decrease and the electric charges induced to the counter electrode layer 51B increase. In this way, electric charges are extracted from the power generating element 1C not only when the displacement member 40 is displaced in the X-axis positive direction but also when the displacement member 40 is displaced in the X-axis negative direction. That is, the displacement member 40 vibrates in the X-axis direction, whereby electric charges are extracted from both the counter electrode layers 51A and 51B. When the displacement member 40 vibrates in the Y-axis direction, electric charges are also extracted from both counter electrode layers 51C and 51D. Therefore, according to the fourth embodiment, it is possible to further improve the power generation efficiency.

The power generation based on fluctuation in the overlapping areas performed by the power generating element 1C is explained.

Figure 6A:
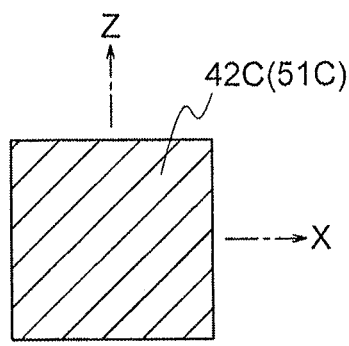
FIGS. 6A, 6B, and 6C are diagrams for explaining the operation of the power generating element according to the fourth embodiment.

When the displacement member 40 vibrates in the X-axis direction, both of the inter-layer distance between the electret material layer 42C and the counter electrode layer 51C and the inter-layer distance between the electret material layer 42D and the counter electrode layer 51D remain fixed. Therefore, concerning the Y-axis direction, the power generation based on fluctuation in the inter-layer distances is not performed. However, the power generation by the same power generation principle as the power generation principle of the power generating element 1000 according to the comparative example is performed concerning the Y-axis direction. More in detail, when the displacement member 40 is not displaced (i.e., when the center of the displacement member 40 is located in the origin O of the XYZ three-dimensional orthogonal coordinate system), a portion where the electret material layer 42C and the counter electrode layer 51C overlap is a region indicated by hatching in FIG. 6A when the power generating element 1C is viewed toward the Y-axis positive direction. The overlapping area is the largest.

Figure 6B:
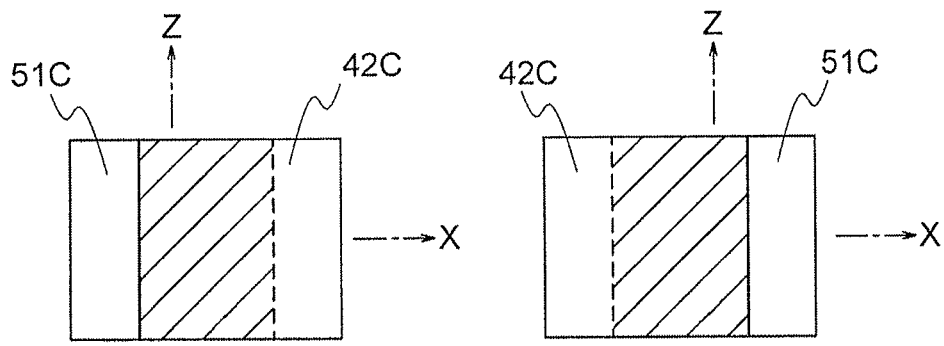

When the displacement member 40 is displaced in the X-axis positive direction from the origin O, as shown in a left figure of FIG. 6B, the area of the portion where the electret material layer 42C and the counter electrode layer 51C overlap (an overlapping area) decreases. Similarly, the area of a portion where the electret material layer 42D and the counter electrode layer 51D overlap also decreases. When the displacement member 40 is displaced in the X-axis negative direction from the origin O, as shown in a right figure of FIG. 6B, the area of the portion where the electret material layer 42C and the counter electrode layer 51C overlap also decreases. Similarly, the area of the portion where the electret material layer 42D and the counter electrode layer 51D overlap also decreases. On the other hand, when the displacement member 40 returns to the origin O with restoration forces of the elastic deformation bodies 61 to 64, the overlapping areas increase.

In this way, when the displacement member 40 vibrates in the X-axis direction, the overlapping areas increase and decrease concerning the Y-axis direction. Therefore, it is possible to perform the power generation based on fluctuation in the overlapping areas. Similarly, when the displacement member 40 vibrates in the Y-axis direction, the overlapping areas increase and decrease concerning the X-axis direction. Therefore, it is possible to perform the power generation based on fluctuation in the overlapping areas.

Further, the power generating element 1C is also capable of receiving vibration energy in the Z-axis direction and performing the power generation based on fluctuation in the overlapping areas. That is, when the displacement member 40 vibrates in the Z-axis direction, the power generation based on fluctuation in the overlapping areas is performed concerning the X-axis and Y-axis directions. More in detail, when the displacement member 40 located in the origin O is displaced in the Z-axis positive direction or the Z-axis negative direction, all of a first overlapping area between the electret material layer 42A and the counter electrode layer 51A, a second overlapping area between the electret material layer 42B and the counter electrode layer 51B, a third overlapping area between the electret material layer 42C and the counter electrode layer 51C, and a fourth overlapping area between the electret material layer 42D and the counter electrode layer 51D decrease. Therefore, electric charges are extracted from the counter electrode layers 51A to 51D.

Figure 6C:
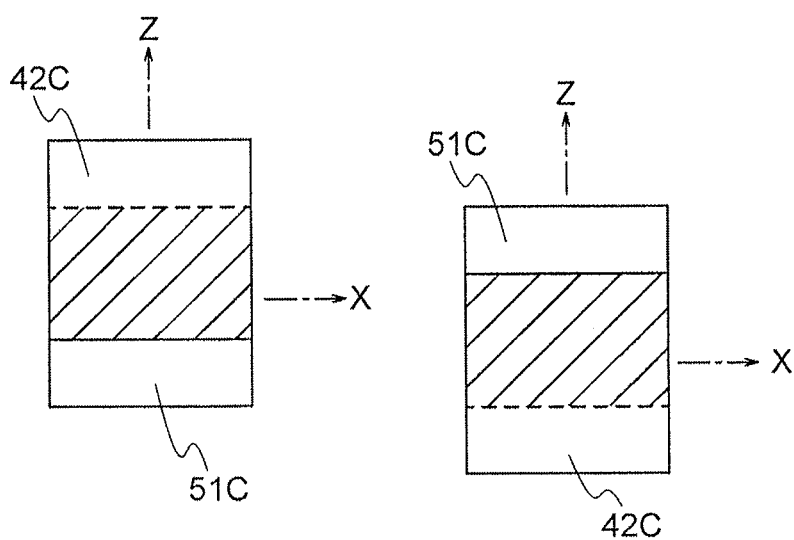

For example, when the displacement member 40 is displaced in the Z-axis positive direction from the origin O, as shown in a left figure of FIG. 6C, the third overlapping area between the electret material layer 42C and the counter electrode layer 51C decreases. Similarly, the first, second, and fourth overlapping areas also decrease. When the displacement member 40 is displaced in the Z-axis negative direction from the origin O, as shown in a right figure of FIG. 6C, the third overlapping area also decreases. Similarly, the first, second, and fourth overlapping areas also decrease. On the other hand, when the displacement member 40 returns to the origin O with restoration forces of the elastic deformation bodies 61 to 64, all of the first to fourth overlapping areas increase. Electric charges are taken into the counter electrode layers 51A to 51D.

In this way, when the displacement member 40 vibrates in the Z-axis direction, the overlapping areas increase and decrease concerning both the directions of the X axis and the Y axis. Therefore, it is possible to perform the power generation based on fluctuation in the overlapping areas.

As explained above, the power generating element 1C according to the fourth embodiment performs the power generation based on fluctuation in the inter-layer distances and the overlapping areas when the displacement member 40 vibrates in the X-axis direction or the Y-axis direction and performs the power generation based on fluctuation in the overlapping areas when the displacement member 40 vibrates in the Z-axis direction. In this way, the power generating element 1C can be used for power generation irrespective of in which direction the displacement member 40 vibrates. Therefore, according to the fourth embodiment, it is possible to perform markedly efficient power generation compared with the power generating element in the past.

Note that this embodiment is not limited to the case in which the displacement member 40 is configured to be capable of being displaced in all the directions of the X axis, the Y axis, and the Z axis when vibration energy is given to the power generating element 1C. That is, the displacement member 40 may be configured to be capable of being displaced in at least two directions among the X axis, the Y axis, and the Z axis of the XYZ three-dimensional orthogonal coordinate system.

Modification of the Fourth Embodiment

Figure 7:
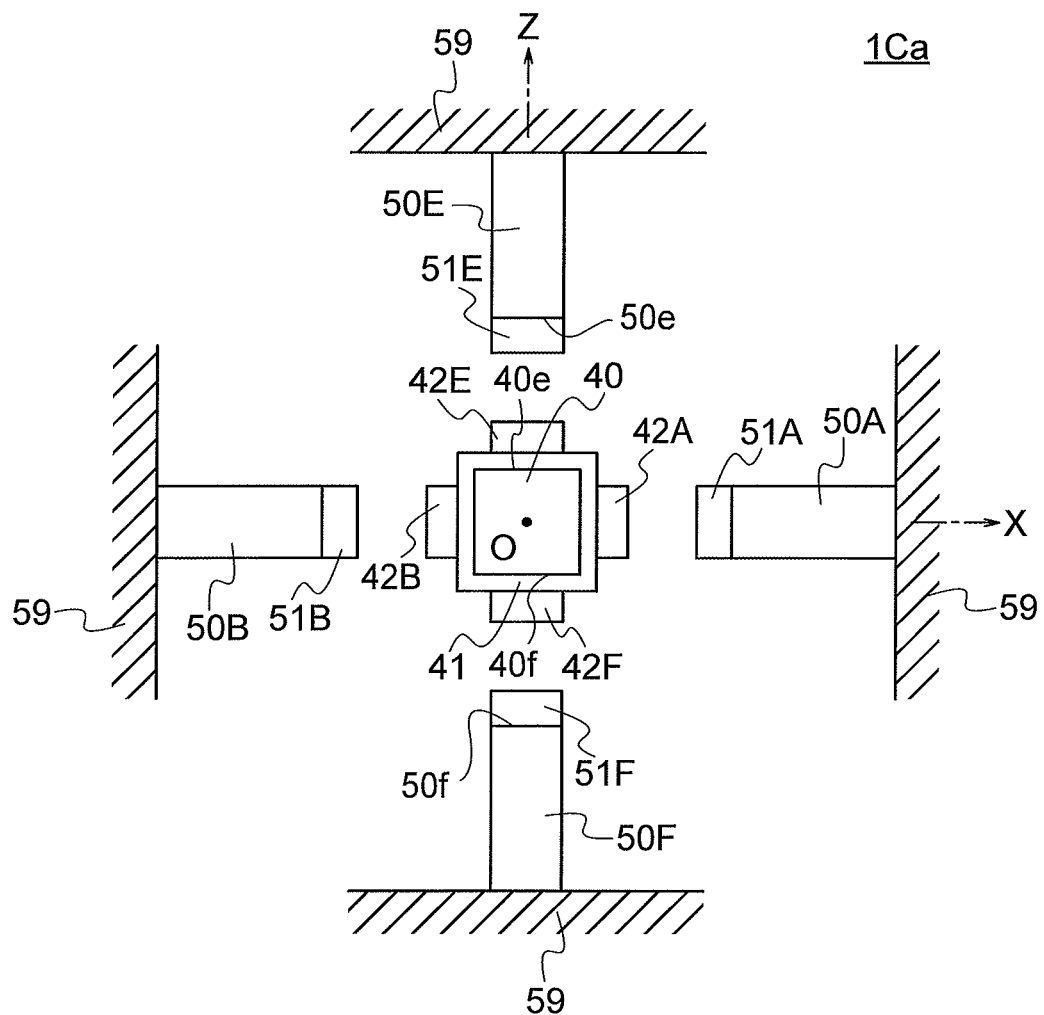
FIG. 7 is a sectional view of a power generating element according to a modification of the fourth embodiment.

A power generating element 1Ca according to a modification of the fourth embodiment is explained with reference to FIG. 7. FIG. 7 is a sectional view showing a cross section taken along an X-Z plane of the power generating element 1Ca. In this modification, fixed members (counter electrode layers) are disposed with respect to surfaces of a displacement member (disposed with respect to six surfaces). That is, in addition to the electret material layers 42A to 42D, electret material layers 42E and 42F are provided above and below the displacement member 40. In this modification, the electret electrode layer 41 is formed over all six surfaces of the displacement member 40 having the rectangular parallelepiped shape.

The displacement member 40 of the power generating element 1Ca further includes, as shown in FIG. 7, a displacement surface 40e (a fifth displacement surface) and a displacement surface 40f (a sixth displacement surface) in addition to the displacement surface 40a, the displacement surface 40b, the displacement surface 40c, and the displacement surface 40d. The displacement surface 40e is a surface orthogonal to the Z-axis positive region. The displacement surface 40f is a surface orthogonal to the Z-axis negative region.

The fixed member 50 of the power generating element 1Ca includes fixed members 50A, 50B, 50C, 50D, 50E, and 50F. The fixed member 50E includes a fixed surface 50e (a fifth fixed surface). The fixed member 50F includes a fixed surface 50f (a sixth fixed surface). The fixed surface 50e is a surface orthogonal to the positive region of the Z axis and opposed to the displacement surface 40e. The fixed surface 50f is a surface orthogonal to the negative region of the Z axis and opposed to the displacement surface 40f. In this way, the fixed member 50 further includes the fixed surface 50e and the fixed surface 50f in addition to the fixed surface 50a, the fixed surface 50b, the fixed surface 50c, and the fixed surface 50d.

The electret material layer 42E (a fifth electret material layer) is formed on one of the displacement surface 40e and the fixed surface 50e. A counter electrode layer 51E (a fifth counter electrode layer) is formed on the other. Similarly, the electret material layer 42F (a sixth electret material layer) is formed on one of the displacement surface 40f and the fixed surface 50f. A counter electrode layer 51F (a sixth counter electrode layer) is formed on the other. In this modification, the electret material layer 42E is formed on the displacement surface 40e via the electret electrode layer 41. The counter electrode layer 51E is formed on the fixed surface 50e. The electret material layer 42F is formed on the displacement surface 40f via the electret electrode layer 41. The counter electrode layer 51F is formed on the fixed surface 50f.

When the displacement member 40 vibrates in the Z-axis direction, the power generating element 1Ca performs the power generation based on fluctuation in the inter-layer distances concerning the Z axis in addition to performing the power generation based on fluctuation in the overlapping areas concerning the X axis and the Y axis. Further, when the displacement member 40 vibrates in the X-axis or Y-axis direction, the power generating element 1Ca performs the power generation based on fluctuation in the overlapping areas concerning the Z axis. Therefore, according to this modification, it is possible to further improve the power generation efficiency of the power generating element.

Fifth to tenth embodiments having more practical configurations are explained below.

Fifth Embodiment

A power generating element 1D according to a fifth embodiment is explained. An operation principle of the power generating element 1D is substantially the same as the operation principle of the power generating element 1C explained in the fourth embodiment. However, the power generating element 1D has a more practical configuration.

Figure 8A:
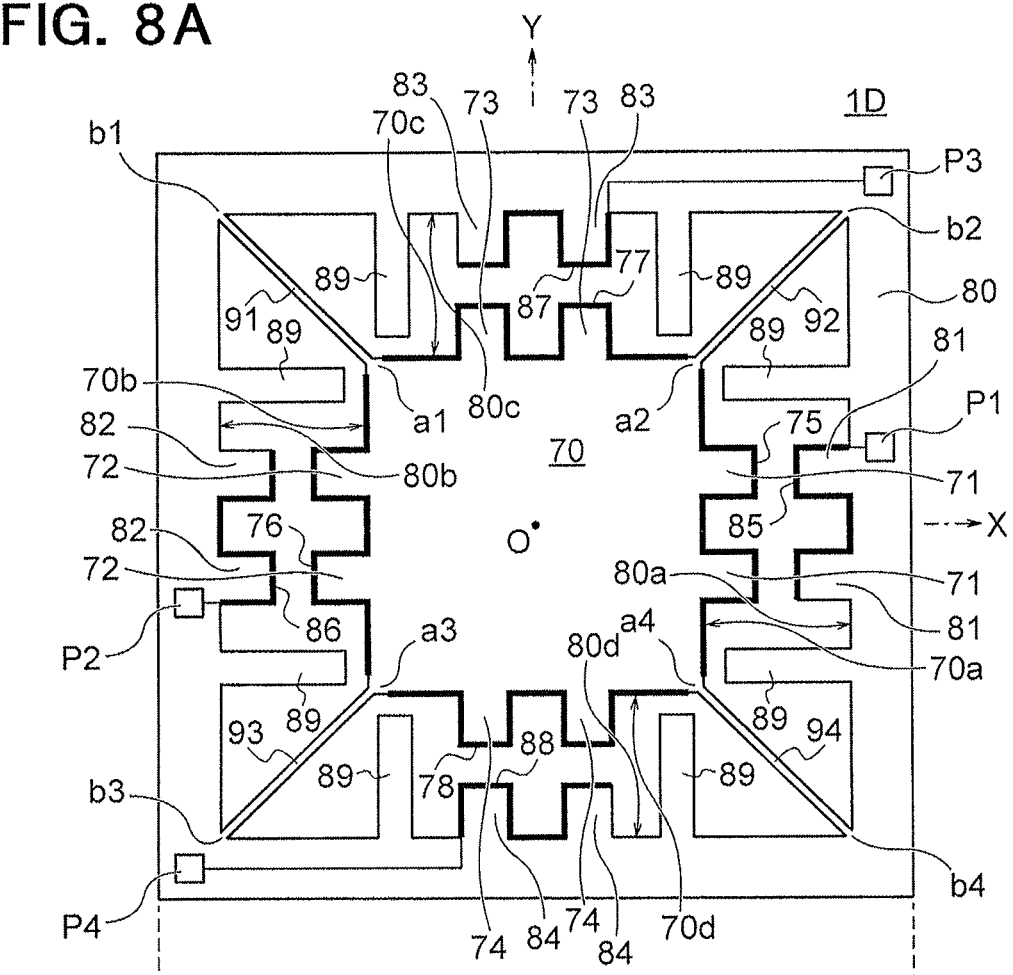
FIG. 8A is a plan view of a power generating element according to a fifth embodiment of the present invention.
Figure 8B:
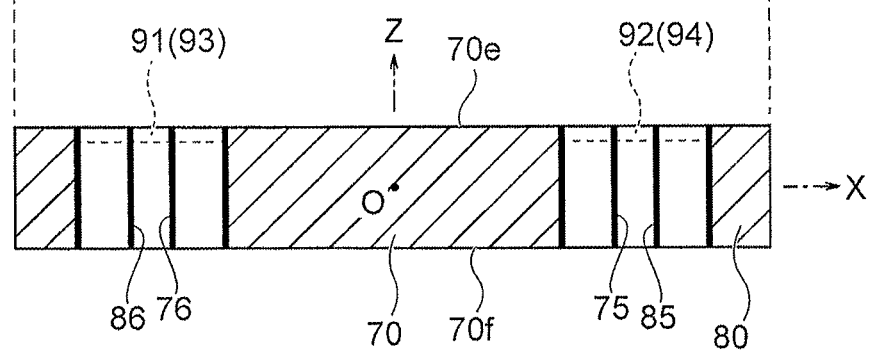
FIG. 8B is a sectional view taken along an X axis of FIG. 8A.

The power generating element 1D according to the fifth embodiment includes, as shown in FIGS. 8A and 8B, a tabular structure 70 functioning as a displacement member, a frame-like structure 80 functioning as a fixed member, and elastic deformation bodies 91 to 94 that connect the tabular structure 70 and the frame-like structure 80.

An XYZ three-dimensional orthogonal coordinate system is defined such that the origin O is arranged in the center position of the tabular structure 70 (the displacement member 40) in a state in which displacement does not occur.

The tabular structure 70 is a member formed in a rectangular shape. The tabular structure 70 includes a displacement outer surface 70a (a first displacement outer surface), a displacement outer surface 70b (a second displacement outer surface), a displacement outer surface 70c (a third displacement outer surface), and a displacement outer surface 70d (a fourth displacement outer surface). The displacement outer surface 70a is a surface orthogonal to the positive region of the X axis. The displacement outer surface 70b is a surface orthogonal to the negative region of the X axis. The displacement outer surface 70c is a surface orthogonal to the positive region of the Y axis. The displacement outer surface 70d is a surface orthogonal to the negative region of the Y axis.

The tabular structure 70 includes an upper surface (a displacement outer surface 70e) and a lower surface (a displacement outer surface 70f) parallel to an XY plane. The displacement outer surface 70e is a surface orthogonal to the positive region of the Z axis. The displacement outer surface 70f is a surface orthogonal to the negative region of the Z axis.

As shown in FIG. 8A, displacement convex sections 71 to 74 are respectively provided on the displacement outer surfaces 70a to 70d of the tabular structure 70. More in detail, the displacement convex section 71 (a first displacement convex section) projecting in the X-axis positive direction is provided on the displacement outer surface 70a. The displacement convex section 72 (a second displacement convex section) projecting in the X-axis negative direction is provided on the displacement outer surface 70b. The displacement convex section 73 (a third displacement convex section) projecting in the Y-axis positive direction is provide on the displacement outer surface 70c. The displacement convex section 74 (a fourth displacement convex section) projecting in the Y-axis negative direction is provided on the displacement outer surface 70d. Note that, in this embodiment, two each of the displacement convex sections 71 to 74 are provided. However, the number of the displacement convex sections 71 to 74 is not limited to this. Any number of displacement convex sections may be provided.

The frame-like structure 80 is disposed to surround the tabular structure 70 and is formed in a rectangular shape. In this embodiment, as shown in FIG. 8B, the thicknesses of the tabular structure 70 and the frame-like structure 80 are substantially the same.

The frame-like structure 80 includes a fixed inner surface 80a (a first fixed inner surface), a fixed inner surface 80b (a second fixed inner surface), a fixed inner surface 80c (a third fixed inner surface), and a fixed inner surface 80d (a fourth fixed inner surface). The fixed inner surface 80a is a surface orthogonal to the positive region of the X axis and opposed to the displacement outer surface 70a. The fixed inner surface 80b is a surface orthogonal to the negative region of the X axis and opposed to the displacement outer surface 70b. The fixed inner surface 80c is a surface orthogonal to the positive region of the Y axis and opposed to the displacement outer surface 70c. The fixed inner surface 80d is a surface orthogonal to the negative region of the Y axis and opposed to the displacement outer surface 70d.

As shown in FIG. 8A, a fixed convex section 81 (a first fixed convex section) projecting in the X-axis negative direction is provided in a position opposed to the displacement convex section 71 on the fixed inner surface 80a. Similarly, a fixed convex section 82 (a second fixed convex section) projecting in the X-axis positive direction is provided in a position opposed to the displacement convex section 72 on the fixed inner surface 80b. A fixed convex section 83 (a third fixed convex section) projecting in the Y-axis negative direction is provided in a position opposed to the displacement convex section 73 on the fixed inner surface 80c. A fixed convex section 84 (a fourth fixed convex section) projecting in the Y-axis positive direction is provided in a position opposed to the displacement convex section 74 on the fixed inner surface 80d.

The top surface of the displacement convex section 71 and the top surface of the fixed convex section 81 are opposed to each other. An electret material layer 75 (a first electret material layer) is formed on one of the opposed surfaces. A counter electrode layer 85 (a first counter electrode layer) is formed on the other. In this embodiment, as shown in FIG. 8A, the electret material layer 75 is formed on the top surface of the displacement convex section 71. The counter electrode layer 85 is formed on the top surface of the fixed convex section 81. The counter electrode layer 85 is electrically connected to a pad P1 via a wire formed on the frame-like structure 80.

The electret material layer 75 only has to be provided on at least the top surface among the surfaces of the displacement convex section 71. As shown in FIG. 8A, the electret material layer 75 may be formed over the entire displacement outer surface 70a. The same applies to electret material layers 76 to 78.

The counter electrode layer 85 only has to be provided on at least the top surface among the surfaces of the fixed convex section 81. As shown in FIG. 8A, the counter electrode layer 85 may be formed not only on the top surface of the fixed convex section 81 but also on the side surface of the fixed convex section 81. The counter electrode layer 85 formed on the side surface of the fixed convex section 81 does not contribute to power generation and functions as a wire. As shown in FIG. 8A, a counter electrode layer may be formed on the fixed inner surface 80a in order to electrically connect counter electrode layers formed on the side surfaces of the fixed convex sections 81 adjacent to each other. The same applies to counter electrode layers 86 to 88.

The top surface of the displacement convex section 72 and the top surface of the fixed convex section 82 are opposed to each other. An electret material layer 76 (a second electret material layer) is formed on one of the opposed surfaces. A counter electrode layer 86 (a second counter electrode layer) is formed on the other. In this embodiment, as shown in FIG. 8A, the electret material layer 76 is formed on the top surface of the displacement convex section 72 and the counter electrode layer 86 is formed on the top surface of the fixed convex section 82. The counter electrode layer 86 is electrically connected to a pad P2 via a wire formed on the frame-like structure 80.

The top surface of the displacement convex section 73 and the top surface of the fixed convex section 83 are opposed to each other. An electret material layer 77 (a third electret material layer) is formed on one of the opposed surfaces. A counter electrode layer 87 (a third counter electrode layer) is formed on the other. In this embodiment, as shown in FIG. 8A, the electret material layer 77 is formed on the top surface of the displacement convex section 73 and the counter electrode layer 87 is formed on the top surface of the fixed convex section 83. The counter electrode layer 87 is electrically connected to a pad P3 via a wire formed on the frame-like structure 80.

The top surface of the displacement convex section 74 and the top surface of the fixed convex section 84 are opposed to each other. An electret material layer 78 (a fourth electret material layer) is formed on one of the opposed surfaces. A counter electrode layer 88 (a fourth counter electrode layer) is formed on the other. In this embodiment, as shown in FIG. 8A, the electret material layer 78 is formed on the top surface of the displacement convex section 74 and the counter electrode layer 88 is formed on the top surface of the fixed convex section 84. The counter electrode layer 88 is electrically connected to a pad P4 via a wire formed on the frame-like structure 80.

The electret material layers 75 to 78 are positively charged in this embodiment. Note that the electret material layers 75 to 78 may be negatively charged.

The pads P1 and P2 and the pads P3 and P4 are desirably electrically connected to separate power generation circuits (diode bridges, etc.) respectively in order to prevent electric charges from cancelling each other. Note that, for example, when increases and decreases of electric charges to be generated coincide, the pads P1 and P2 and the pads P3 and P4 may be electrically connected to the same power generation circuit.

Electret electrode layers (not shown in FIG. 8A) are respectively provided between the electret material layers 75 to 78 and the displacement outer surfaces 70*a* to 70*d*. The electret electrode layers are electrically connected to the power generation circuit (the diode bridge, etc.) of the power generating device via wires (not shown in FIG. 8A) formed on the elastic deformation bodies 91 to 94.

Note that the electret material layers 75 to 78 may be an integral layer made of an electret material. That is, an electret material layer may be formed over the entire periphery of the side surface of the tabular structure 70.

Counter electrode layers may be formed on the displacement outer surfaces 70*a* to 70*d* of the tabular structure 70. Electret electrode layers and electret material layers may be formed in this order on the fixed inner surfaces 80*a* to 80*d* of the frame-like structure 80.

In the power generating element 1D according to the fifth embodiment, the tabular structure 70 and the frame-like structure 80 are connected by the four elastic deformation bodies 91 to 94 to enable the tabular structure 70 to be displaced in all the directions of the X axis, the Y axis, and the Z axis.

As shown in FIG. 8A, one ends of the elastic deformation bodies 91 to 94 are fixed to inner side corner portions of the frame-like structure 80 and the other ends of the elastic deformation bodies 91 to 94 are fixed to corner portions of the tabular structure 70. More in detail, one ends of the elastic deformation bodies 91, 92, 93, and 94 are respectively connected to the displacement support points a1, a2, a3, and a4 and the other ends of the elastic deformation bodies 91, 92, 93, and 94 are respectively connected to the fixed support points b1, b2, b3, and b4. The displacement support points a1 to a4 are provided in the tabular structure 70. The fixed support points b1 to b4 are provided in the frame-like structure 80. More in detail, the displacement support points a1, a2, a3, and a4 are provided in four places corresponding to four vertexes of the tabular structure 70 formed in a rectangular shape. The fixed support points b1, b2, b3, and b4 are provided in four places near four vertexes of the frame-like structure 80 formed in a rectangular shape.

The displacement support points and the fixed support points correspond in a one-to-one relation. The corresponding displacement support points and fixed support points are respectively connected by individual elastic deformation bodies. That is, the displacement support point a1 and the fixed support point b1 are connected by the elastic deformation body 91. The displacement support point a2 and the fixed support point b2 are connected by the elastic deformation body 92. The displacement support point a3 and the fixed support point b3 are connected by the elastic deformation body 93. The displacement support point a4 and the fixed support point b4 are connected by the elastic deformation body 94.

As shown in FIG. 8B, the elastic deformation bodies 91, 92, 93, and 94 have thickness smaller than the thickness of the tabular structure 70 and the thickness of the frame-like structure 80. The elastic deformation bodies 91, 92, 93, and 94 are configured by elongated linear structures.

Figure 9A:
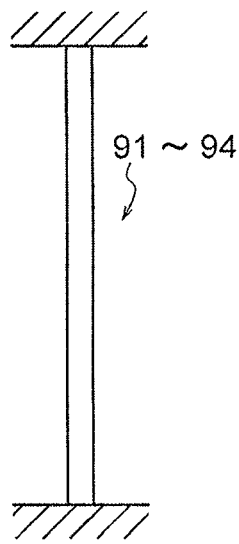
FIGS. 9A, 9B, and 9C are diagrams showing an elastic deformation body according to one embodiment.
Figure 9B:
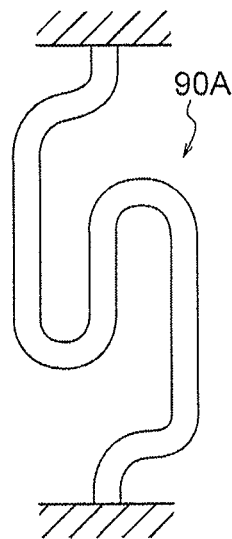
Figure 9C:
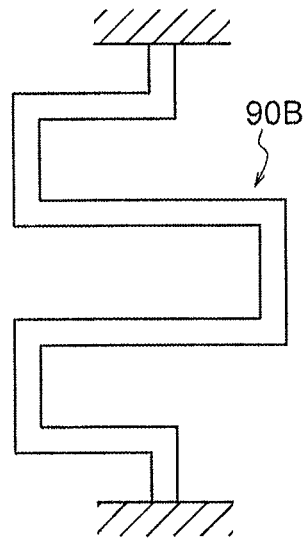
Figures 10A, 10B:
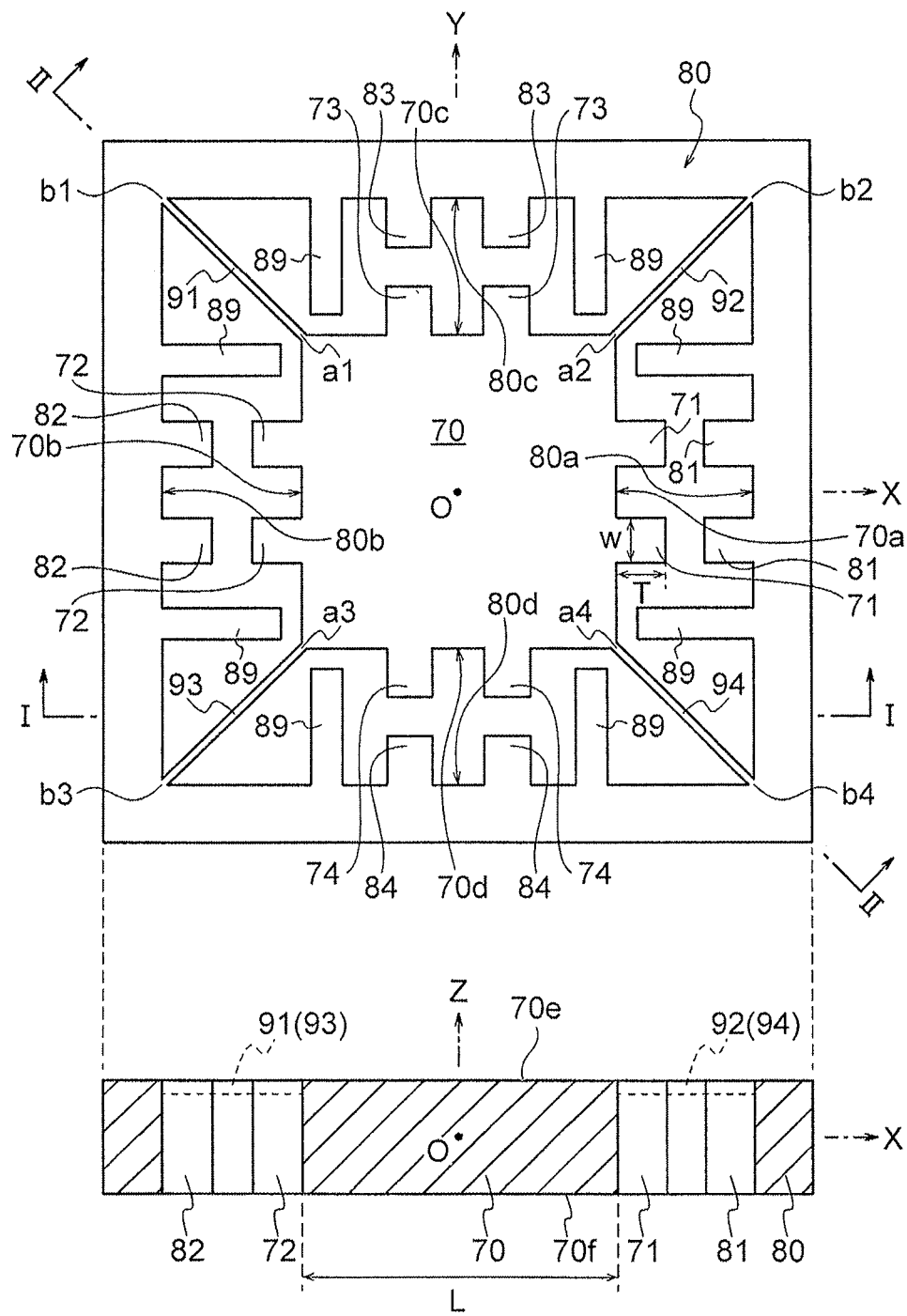
FIG. 10A is a plan view for explaining a manufacturing method for the power generating element according to the fifth embodiment.
FIG. 10B is a sectional view taken along the X-axis of FIG. 10A.

FIG. 9A shows the elastic deformation bodies 91 to 93 each configured from one linear structure. Note that the elastic deformation bodies 91 to 94 are not limited to such a form and can take various forms. For example, the tabular structure 70 and the frame-like structure 80 may be connected by an elastic deformation body 90A shown in FIG. 9B or an elastic deformation body 90B shown in FIG. 9C. The elastic deformation body 90A is configured by a curved elongated linear structure. The elastic deformation body 90B is configured by a bent elongated linear structure. By forming an elastic deformation body in such a curved or bent shape, the elastic deformation body is easily deformed and a spring constant can be reduced. Consequently, it is possible to adjust the vibration frequency of the tabular structure 70 to external vibration (environmental vibration, etc.) having a low frequency. As a result, it is possible to improve power generation efficiency of the power generating element 1D. Note that a curvature of curved portions or bent portions and the number of the curved portions and the bent portions are selected according to a desired spring constant.

As shown in FIG. 8A, stopper protrusions 89 projecting toward the tabular structure 70 are provided on the inner side surface of the frame-like structure 80. More in detail, two stopper protrusions 89 are provided on each of the fixed inner surfaces 80*a* to 80*d* of the frame-like structure 80.

In a state in which the tabular structure 70 is not displaced (i.e., a state in which the center of the tabular structure 70 is located in the origin O), a predetermined gap dimension is secured between the stopper protrusions 89 and the tabular structure 70. The gap dimension is set to a dimension that can prevent the tabular structure 70 from being displaced excessively to cause damage to elastic deformation bodies 91 to 94.

Note that the gap dimension may be set to a dimension that can prevent the tabular structure 70 from being displaced to cause contact and a short-circuit of the electret material layer and the counter electrode layer opposed to each other. For example, the gap dimension is set such that the electret material layer 75 and the counter electrode layer 85 do not come into contact when the tabular structure 70 is displaced in the X-axis positive direction. Specifically, the length of the stopper protrusions 89 is set such that the distance between the displacement outer surface 70*a* and top surfaces of the stopper protrusions 89 is shorter than the distance between the top surface of the displacement convex section 71 and the top surface of the fixed convex section 81 in a state in which the tabular structure 70 is not displaced.

The operation of the power generating element 1D according to the fifth embodiment is explained. An operation principle of the power generating element 1D is substantially the same as the operation principle of the power generating element 1C according to the fourth embodiment.

When a force in the +X-axis direction acts on the tabular structure 70, the displacement convex section 71 approaches the fixed convex section 81 and the displacement convex section 72 separates from the fixed convex section 82. Consequently, the distance between the displacement convex section 71 and the fixed convex section 81 decreases and the distance between the displacement convex section 72 and the fixed convex section 82 increases. The inter-layer distance between the electret material layer 75 in the top surface portion of the displacement convex section 71 and the counter electrode layer 85 in the top surface portion of the fixed convex section 81 fluctuates. Therefore, electric charges induced to the counter electrode layer 85 increase and electric charges induced to the counter electrode layer 86 decrease. As a result, electric charges are taken into the inside of the power generating element 1D from the pad P1 and electric charges are extracted to the outside of the power generating element 1D from the pad P2.

Conversely, when a force in the −X-axis direction acts on the tabular structure 70, electric charges induced to the counter electrode layer 85 decrease and electric charges induced to the counter electrode layer 86 increase. As a result, electric charges are extracted to the outside of the power generating element 1D from the pad P1 and electric charges are taken into the inside of the power generating element 1D from the pad P2.

In this way, when the tabular structure 70 vibrates in the X-axis direction, it is possible to extract electric power based on fluctuation in the inter-layer distances from the pads P1 and P2. Similarly, when the tabular structure 70 vibrates in the Y-axis direction, it is possible to extract electric power based on fluctuation in the inter-layer distances from the pads P3 and P4.

Not only the power generation based on fluctuation in the inter-layer distances but also the power generation based on fluctuation in the overlapping areas is performed. That is, when the tabular structure 70 vibrates in the X-axis direction, an overlapping area between the electret material layer 77 and the counter electrode layer 87 and an overlapping area between the electret material layer 78 and the counter electrode layer 88 increase and decrease. Therefore, the power generating element 1D can perform the power generation based on fluctuation in the overlapping areas like the power generating element 1000 in the comparative example. That is, with the power generating element 1D, when the tabular structure 70 vibrates in the X-axis direction, it is possible to extract electric power not only from the pads P1 and P2 but also from the pads P3 and P4.

When the tabular structure 70 vibrates in the Y-axis direction, in the same manner as when the tabular structure 70 vibrates in the X-axis direction, it is possible to extract electric power from the pads P1 to P4. More in detail, when the tabular structure 70 vibrates in the Y-axis direction, electric power based on fluctuation in the overlapping areas is extracted from the pads P1 and P2 and electric power based on fluctuation in the inter-layer distances is extracted from the pads P3 and P4.

Note that, as shown in FIG. 8A, a plurality of sets (in this embodiment, two sets) of each of a pair of the displacement convex section 71 and the fixed convex section 81 and a pair of the displacement convex section 72 and the fixed convex section 82 are provided. Consequently, when the tabular structure 70 vibrates in the Y-axis direction, it is possible to increase a power generation amount by fluctuation in the overlapping areas to a double compared with when the number of pairs is one set. Similarly, a plurality of sets (in this embodiment, two sets) of each of a pair of the displacement convex section 73 and the fixed convex section 83 and a pair of the displacement convex section 74 and the fixed convex section 84 are provided. Consequently, it is possible to increase a power generation amount by fluctuation in the overlapping areas when the tabular structure 70 vibrates in the X-axis direction. Note that the number of pairs is not limited to two sets and may be three or more sets.

The power generation by fluctuation in the overlapping areas is also performed when the tabular structure 70 vibrates in the Z-axis direction. More in detail, when the tabular structure 70 located in the origin O is displaced in the Z-axis positive direction or the Z-axis negative direction, all of an overlapping area between the electret material layer 75 and the counter electrode layer 85, an overlapping area between the electret material layer 76 and the counter electrode layer 86, an overlapping area between the electret material layer 77 and the counter electrode layer 87, and an overlapping area between the electret material layer 78 and the counter electrode layer 88 decrease. Therefore, electric charges are extracted from the counter electrode layers 85 to 88 (i.e., P1 to P4). Thereafter, when the tabular structure 70 returns to the origin O with restoration forces of the elastic deformation bodies 91 to 94, all the overlapping areas increase. Therefore, electric charges are taken into the counter electrode layers 85 to 88 (i.e., P1 to P4).

As explained above, when the tabular structure 70 vibrates in the X-axis direction, the power generating element 1D according to the fifth embodiment performs the power generation based on fluctuation in the inter-layer distances in the fixed convex sections 81 and 82 concerning the X-axis direction and performs the power generation based on fluctuation in the overlapping areas in the fixed convex sections 83 and 84 concerning the Y-axis direction. Similarly, when the tabular structure 70 vibrates in the Y-axis direction, the power generating element 1D performs the power generation based on fluctuation in the inter-layer distances in the fixed convex sections 83 and 84 concerning the Y-axis direction and performs the power generation based on fluctuation in the overlapping areas in the fixed convex sections 81 and 82 concerning the X-axis direction. Further, when the tabular structure 70 vibrates in the Z-axis direction, the power generating element 1D performs the power generation based on fluctuation in the overlapping areas in the fixed convex sections 81 to 84. Therefore, according to the fifth embodiment, it is possible to perform markedly efficient power generation compared with the power generating element in the past.

<Manufacturing Method for the Power Generating Element>

An overview of an example of a manufacturing method for the power generating element 1D is explained.

First, a semiconductor substrate such as a silicon substrate is prepared. The thickness of the semiconductor substrate is, for example, 300 μM.

Figure 11A:
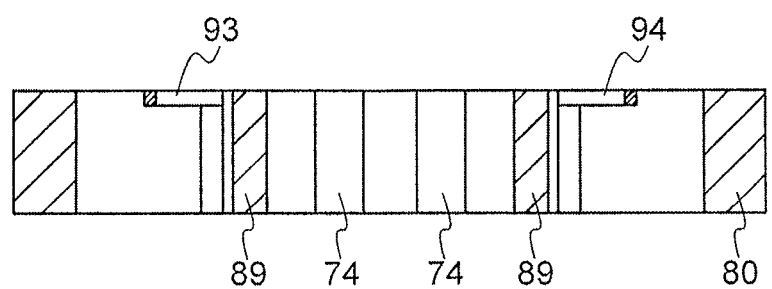
FIG. 11A is a sectional view taken along a I-I line of FIG. 10A.
Figure 11B:
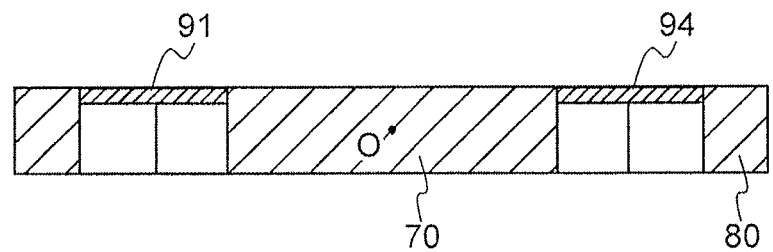
FIG. 11B is a sectional view taken along a II-II line of FIG. 10A.

Subsequently, the semiconductor substrate is machined into a desired shape using a photolithography technique. Specifically, the semiconductor substrate is machined as shown in FIGS. 10A and 10B and FIGS. 11A and 11B. FIG. 11A is a sectional view taken along a I-I line of FIG. 10A. FIG. 11B is a sectional view taken along a II-II line of FIG. 10A.

The elastic deformation bodies 91 to 94 are thinner than the other portions. As the dimensions of the parts, for example, a length L of a side of the tabular structure 70 is 7 mm, a width w of the displacement convex sections 71 to 74 is 100 μm, and a height T of the displacement convex sections 71 to 74 is 100 μm. As the sizes of the elastic deformation bodies 91 to 94, for example, a width is approximately 100 μm, a thickness is approximately 30 μm, and a length is approximately 1 mm.

Figure 12A:
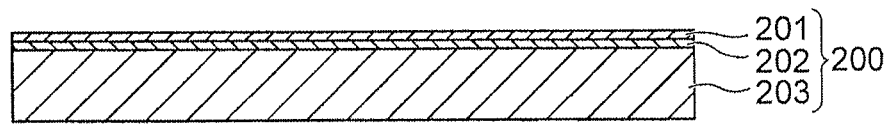
FIG. 12A is a sectional view of a SOI substrate.
Figure 12B:
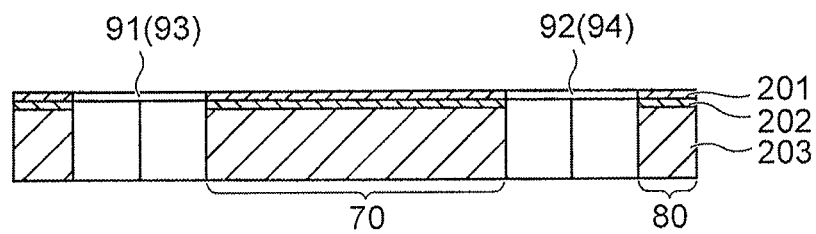
FIGS. 12B and 12C are sectional views of the SOI substrate on which elastic deformation bodies are formed.
Figure 12C:
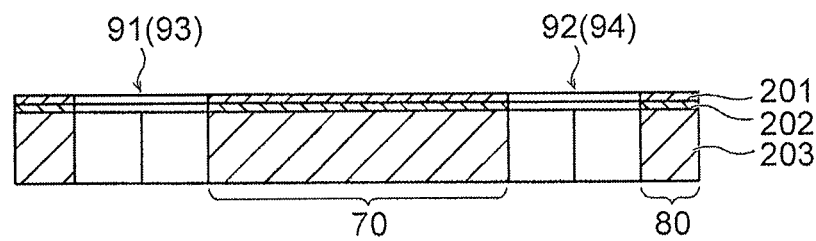

Note that a SOI (Silicon On Insulator) substrate may be used as the semiconductor substrate. As shown in FIG. 12A, a SOI substrate 200 includes a surface Si layer 201, a BOX (Buried Oxide) layer 202, and a Si substrate 203. When the SOI substrate is used, the elastic deformation bodies 91 to 94 are configured from only the surface Si layer 201 as shown in FIG. 12B or configured from the surface Si layer 201 and the BOX layer 202 as shown in FIG. 12C). When the SOI substrate is used, the BOX layer 202 can be used as an etching stopper. Therefore, it is possible to easily perform an etching process.

After the semiconductor substrate is machined into a desired shape, electret electrode layers made of a conductor such as aluminum or copper are formed on the displacement outer surfaces 70a to 70d of the tabular structure 70. As a method for the formation, a PVD (Physical Vapor Deposition) method such as sputtering is used.

Subsequently, the electret material layers 75 to 78 are formed on the electret electrode layer formed on the side surface of the tabular structure 70. For example, an oxide film containing alkali ions (e.g., potassium ions) is formed by alkali mixed oxidation and polarization processing for applying a voltage to the oxide film while heating the oxide film with a heater is performed, whereby the electret material layers 75 and 78 are formed. As another method, electret material layers may be joined on the electret electrode layer.

Subsequently, the counter electrode layers 85 to 88 made of a conductor such as aluminum or copper are formed on the fixed inner surfaces 80a to 80d of the frame-like structure 80. The pads P1 to P4 and wires that respectively electrically connect the pads P1 to P4 and the counter electrode layers 85 to 88 are formed on the frame-like structure 80. As a method for the formation, a PVD method such as sputtering is used. Note that, when the electret electrode layer is formed, the counter electrode layers 85 to 88, the pads P1 to P4, and the like may be formed together.

The power generating element 1D is manufactured through the process explained above. Power generating elements according to embodiments and modifications explained below are manufactured by the same method.

Modification of the Fifth Embodiment

A power generating element according to a modification of the fifth embodiment is explained with reference to FIG. 13.

A power generating element 1Da according to this modification further includes an upper lid body 52 and a lower lid body 53 in addition to the components of the power generating element 1D. The power generating element 1Da is explained centering on differences from the fifth embodiment.

The tabular structure 70 further includes, in addition to the displacement outer surfaces 70a to 70d, the displacement outer surface 70e (a fifth displacement outer surface) orthogonal to the positive region of the Z axis and the displacement outer surface 70f (a sixth displacement outer surface) orthogonal to the negative region of the Z axis. Electret electrode layers (not shown in FIG. 13) are formed on the displacement outer surfaces 70a to 70f of the tabular structure 70.

Figure 13:
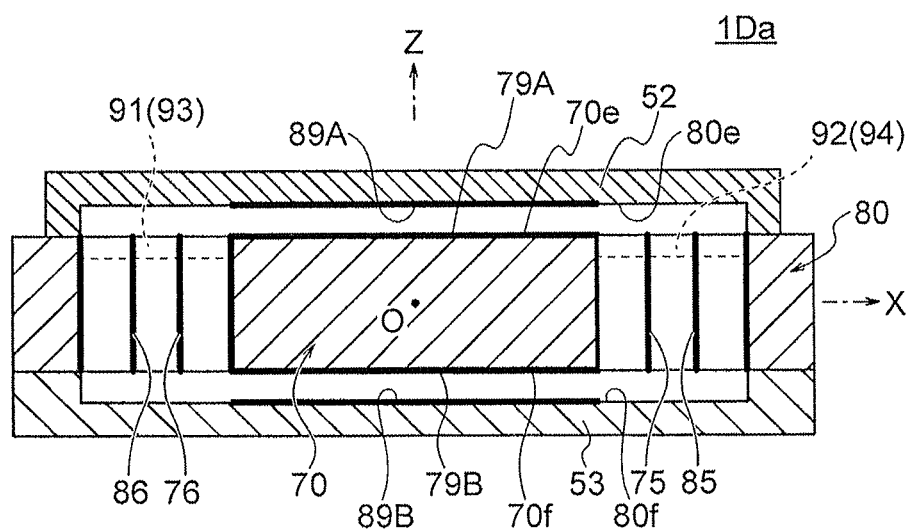
FIG. 13 is a sectional view of a power generating element according to a modification of the fifth embodiment.

The frame-like structure 80 (a fixed member) further includes, as shown in FIG. 13, the upper lid body 52 that covers the upper part of the tabular structure 70 and the lower lid body 53 that covers the lower part of the tabular structure 70. The lower surface of the upper lid body 52 forms a fixed inner surface 80e (a fifth fixed inner surface) orthogonal to the positive region of the Z axis and opposed to the displacement outer surface 70e. The upper surface of the lower lid body 53 forms a fixed inner surface 80f (a sixth fixed inner surface) orthogonal to the negative region of the Z axis and opposed to the displacement outer surface 70f.

An electret material layer 79A (a fifth electret material layer) is formed on one of the displacement outer surface 70e and the fixed inner surface 80e. A counter electrode layer 89A (a fifth counter electrode layer) is formed on the other. In this embodiment, as shown in FIG. 13, the electret material layer 79A is formed on the displacement outer surface 70e via an electret electrode layer and the counter electrode layer 89A is formed on the fixed inner surface 80e.

An electret material layer 79B (a sixth electret material layer) is formed on one of the displacement outer surface 70f and the fixed inner surface 80f. A counter electrode layer 89B (a sixth counter electrode layer) is formed on the other. In this embodiment, as shown in FIG. 13, the electret material layer 79B is formed on the displacement outer surface 70f via an electret electrode layer and the counter electrode layer 89B is formed on the fixed inner surface 80f.

As explained above, in the power generating element 1Da according to this modification, the electret material layers are formed on all the six surfaces of the tabular structure 70 having the substantially rectangular parallelepiped shape. In the frame-like structure 80, the counter electrode layers are disposed with respect to the electret material layers on the surfaces. Consequently, when the tabular structure 70 vibrates in the Z-axis direction, it is possible to perform the power generation based on fluctuation in the inter-layer distances. When the tabular structure 70 vibrates in the X-axis or Y-axis direction, it is possible to perform the power generation based on fluctuation in the overlapping areas in the fixed convex sections 81 to 84. Therefore, according to this modification, it is possible to further improve the power generation efficiency.

Note that it is also possible to cause the upper lid body 52 and the lower lid body 53 to function as stoppers for stopping the tabular structure 70 from vibrating in the Z-axis direction. In this case, in a state in which the tabular structure 70 (a displacement member) is not displaced, a predetermined gap dimension is secured between the lower surface (the fixed inner surface 80e) of the upper lid body 52 and the upper surface (the displacement outer surface 70e) of the tabular structure 70. A predetermined gap dimension is secured between the upper surface (the fixed inner surface 80f) of the lower lid body 53 and the lower surface (the displacement outer surface 70f) of the tabular structure 70. The gap dimension is set to a dimension that can prevent the tabular structure 70 from being displaced excessively to cause damage to elastic deformation bodies 91 to 94. Note that the gap dimension may be set to a dimension that can prevent the tabular structure 70 from being displaced in the Z-axis direction to cause contact and a short-circuit of the electret material layer 79A and the counter electrode layer 89A or the electret material layer 79B and the counter electrode layer 89B.

The upper lid body 52 and the lower lid body 53 may be provided in the power generating element 1D only to function as the stoppers. In this case, it is unnecessary to provide the counter electrode layers 89A and 89B.

As explained above, in the fifth embodiment, the partially projecting convex sections (i.e., the displacement convex sections 71 to 74 and the fixed convex sections 81 to 84) are provided in both of the tabular structure 70 (the displacement member) and the frame-like structure 80 (the fixed member). On the other hand, in sixth to ninth embodiments explained below, partially projecting convex sections are provided in one of the tabular structure 70 (the displacement member) and the frame-like structure 80 (the fixed member) and concave sections that house the convex sections are provided in the other.

Sixth Embodiment

A power generating element 1E according to a sixth embodiment is explained. One of differences from the fifth embodiment is that displacement convex sections of the tabular structure 70 are housed in fixed concave sections provided in the frame-like structure 80. The sixth embodiment is explained below centering on the differences.

Figure 14A:
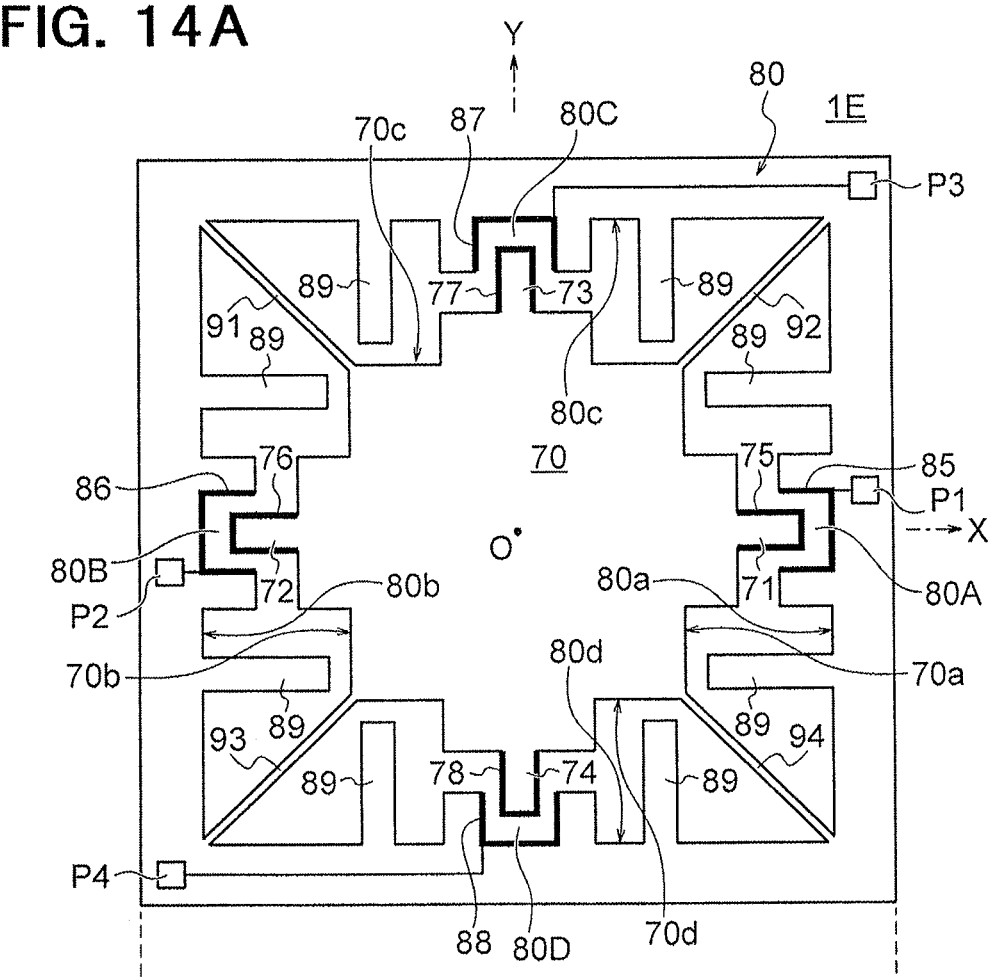
FIG. 14A is a plan view of a power generating element according to a sixth embodiment of the present invention.
Figure 14B:
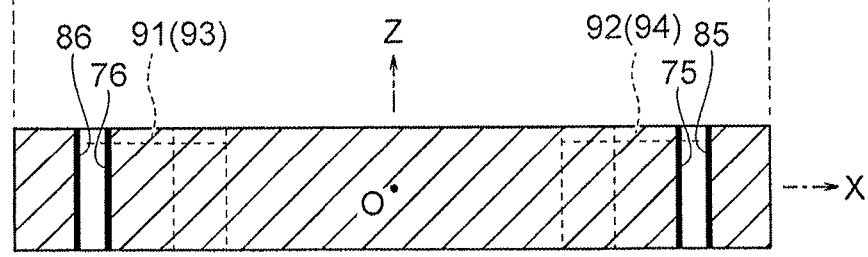
FIG. 14B is a sectional view taken along the X axis of FIG. 14A.

The power generating element 1E according to the sixth embodiment includes, as shown in FIGS. 14A and 14B, the tabular structure 70 functioning as a displacement member, the frame-like structure 80 functioning as a fixed member, and the elastic deformation bodies 91 to 94 that connect the tabular structure 70 and the frame-like structure 80.

As shown in FIG. 14A, the displacement convex sections 71 to 74 are respectively provided on the displacement outer surfaces 70a to 70d of the tabular structure 70. More in detail, the displacement convex section 71 projecting in the X-axis positive direction is provided on the displacement outer surface 70a. The displacement convex section 72 projecting in the X-axis negative direction is provided on the displacement outer surface 70b. The displacement convex section 73 projecting in the Y-axis positive direction is provided on the displacement outer surface 70c. The displacement convex section 74 projecting in the Y-axis negative direction is provided on the displacement outer surface 70d.

Fixed concave sections 80A to 80D are respectively provided on the fixed inner surfaces 80a to 80d of the frame-like structure 80. More in detail, the fixed concave section 80A (a first fixed concave section) that houses the displacement convex section 71 is provided on the fixed inner surface 80a. The fixed concave section 80B (a second fixed concave section) that houses the displacement convex section 72 is provided on the fixed inner surface 80b. The fixed concave section 80C (a third fixed concave section) that houses the displacement convex section 73 is provided on the fixed inner surface 80c. The fixed concave section 80D (a fourth fixed concave section) that houses the displacement convex section 74 is provided on the fixed inner surface 80d.

As shown in FIG. 14A, a top surface and the side surface of the displacement convex section 71 and a bottom surface and the side surface of the fixed concave section 80A are opposed to each other. That is, the top surface of the displacement convex section 71 and the bottom surface of the fixed concave section 80A are opposed and the side surface of the displacement convex section 71 and the side surface of the fixed concave section 80A are opposed. The electret material layer 75 is formed on one of the opposed surfaces. The counter electrode layer 85 is formed on the other. In this embodiment, the electret material layer 75 is formed on the top surface and the side surface of the displacement convex section 71 via an electret electrode layer (not shown in FIG. 14A). The counter electrode layer 85 is formed on the bottom surface and the side surface of the fixed concave section 80A.

Similarly, the top surface and the side surface of the displacement convex section 72 and the bottom surface and the side surface of the fixed concave section 80B are opposed to each other. The electret material layer 76 is formed on one of the opposed surfaces. The counter electrode layer 86 is formed on the other. In this embodiment, the electret material layer 76 is formed on the top surface and the side surface of the displacement convex section 72 via an electret electrode layer (not shown in FIG. 14A). The counter electrode layer 86 is formed on the bottom surface and the side surface of the fixed concave section 80B.

The top surface and the side surface of the displacement convex section 73 and the bottom surface and the side surface of the fixed concave section 80C are opposed to each other. The electret material layer 77 is formed on one of the opposed surfaces. The counter electrode layer 87 is formed on the other. In this embodiment, the electret material layer 77 is formed on the top surface and the side surface of the displacement convex section 73 via an electret electrode layer (not shown in FIG. 14A). The counter electrode layer 87 is formed on the bottom surface and the side surface of the fixed concave section 80C.

The top surface and the side surface of the displacement convex section 74 and the bottom surface and the side surface of the fixed concave section 80D are opposed to each other. The electret material layer 78 is formed on one of the opposed surfaces. The counter electrode layer 88 is formed on the other. In this embodiment, the electret material layer 78 is formed on the top surface and the side surface of the displacement convex section 74 via an electret electrode layer (not shown in FIG. 14A). The counter electrode layer 88 is formed on the bottom surface and the side surface of the fixed concave section 80D.

The electret electrode layers are respectively provided between the electret material layers 75 to 78 and the displacement convex sections 71 to 74. The electret electrode layers are electrically connected to a power generation circuit via wires (not shown in FIG. 14A) formed on the elastic deformation bodies 91 to 94.

As shown in FIG. 14A, the counter electrode layer 85 is electrically connected to the pad P1 via a wire formed on the frame-like structure 80. The counter electrode layer 86 is electrically connected to the pad P2 via a wire formed on the frame-like structure 80. The counter electrode layer 87 is electrically connected to the pad P3 via a wire formed on the frame-like structure 80. The counter electrode layer 88 is electrically connected to the pad P4 via a wire formed on the frame-like structure 80.

The operation of the power generating element 1E according to the sixth embodiment is explained.

When the tabular structure 70 is displaced in the +X-axis direction, the displacement convex section 71 is inserted deeply into the fixed concave section 80A (i.e., housed in the fixed concave section 80A more) and the displacement convex section 72 is shallowly inserted into the fixed concave section 80B (i.e., housed in the fixed concave section 80B less). Consequently, the inter-layer distance between the electret material layer 75 in the top surface portion of the displacement convex section 71 and the counter electrode layer 85 in the bottom surface portion of the fixed concave section 80A decreases. The inter-layer distance between the electret material layer 76 in the top surface portion of the displacement convex section 72 and the counter electrode layer 86 in the bottom surface portion of the fixed concave section 80B increases. Electric charges induced to the counter electrode layer 85 increase. Electric charges induced to the counter electrode layer 86 decrease.

Conversely, when the tabular structure 70 is displaced in the −X-axis direction, electric charges induced to the counter electrode layer 85 decrease and electric charges induced to the counter electrode layer 86 increase.

When the tabular structure 70 vibrates in the X-axis direction, power generation is performed by fluctuation in overlapping areas as well. More in detail, when the tabular structure 70 is displaced in the +X-axis direction, an overlapping area between the electret material layer 75 in the side surface portion of the displacement convex section 71 and the counter electrode layer 85 in the side surface portion of the fixed concave section 80A increases. Therefore, electric charges induced to the counter electrode layer 85 in the side surface portion of the fixed concave section 80A increase. On the other hand, an overlapping area between the electret material layer 76 in the side surface portion of the displacement convex section 72 and the counter electrode layer 86 in the side surface portion of the fixed concave section 80B decreases. Therefore, electric charges induced to the counter electrode layer 86 in the side surface portion of the fixed concave section 80B decrease.

Therefore, when the tabular structure 70 is displaced in the +X-axis direction, electric charges induced to the counter electrode layer 85 increase according to fluctuation in the inter-layer distances and the overlapping areas. Therefore, electric charges are taken into the inside of the power generating element 1E from the pad P1 and electric charges are extracted to the outside of the power generating element 1E from the pad P2. Conversely, when the tabular structure 70 is displaced in the −X-axis direction, electric charges are extracted to the outside of the power generating element 1E from the pad P1 and electric charges are taken into the inside of the power generating element 1E from the pad P2.

Note that, when the tabular structure 70 vibrates in the Y-axis direction, the power generating element 1E performs power generation according to the same operation principle as the operation principle in the case of the vibration in the X-axis direction.

When the tabular structure 70 vibrates in the Z-axis direction, the power generating element 1E performs the power generation based on fluctuation in the overlapping areas in the fixed concave sections 80A to 80D.

As explained above, in the power generating element 1E, when the tabular structure 70 vibrates in the X-axis direction, the power generation based on fluctuation in the inter-layer distances and the overlapping areas is performed and electric power is extracted from the pads P1 and P2. When the tabular structure 70 vibrates in the Y-axis direction, the power generation based on fluctuation in the inter-layer distances and the overlapping areas is performed and electric power is extracted from the pads P3 and P4.

Note that, when the tabular structure 70 vibrates in the X-axis direction, since power generation by the fixed concave sections 80C and 80D is not performed, electric power is not extracted from the pads P3 and P4. Similarly, when the tabular structure 70 vibrates in the Y-axis direction, since power generation by the fixed concave sections 80A and 80B is not performed, electric power is not extracted from the pads P1 and P2. This is because, since the electret material layer approaches one side surface of the left and right side surfaces of the fixed concave section and, at the same time, moves away from the other side surface, an increase and a decrease of induced electric charges are canceled for the entire counter electrode layer.

As explained above, the power generating element 1E according to the sixth embodiment performs the power generation based on fluctuation in the inter-layer distances and the overlapping areas concerning the X-axis direction according to the vibration in the X-axis direction of the tabular structure 70. Similarly, the power generating element 1E performs the power generation based on fluctuation in the inter-layer distances and the overlapping areas concerning the Y-axis direction according to the vibration in the Y-axis direction of the tabular structure 70. Further, the power generating element 1E performs the power generation based on fluctuation in the overlapping areas concerning side surfaces of the frame-like structure 80 according to the vibration in the Z-axis direction of the tabular structure 70. Therefore, according to the sixth embodiment, it is possible to perform markedly efficient power generation compared with the power generating element in the past.

Seventh Embodiment

A power generating element 1F according to a seventh embodiment is explained. One of differences from the sixth embodiment is that a counter electrode layer is individually provided on each of the bottom surface, the left side surface, and the right side surface of a fixed concave section. The seventh embodiment is explained below centering on the differences.

Figures 15A, 15B:
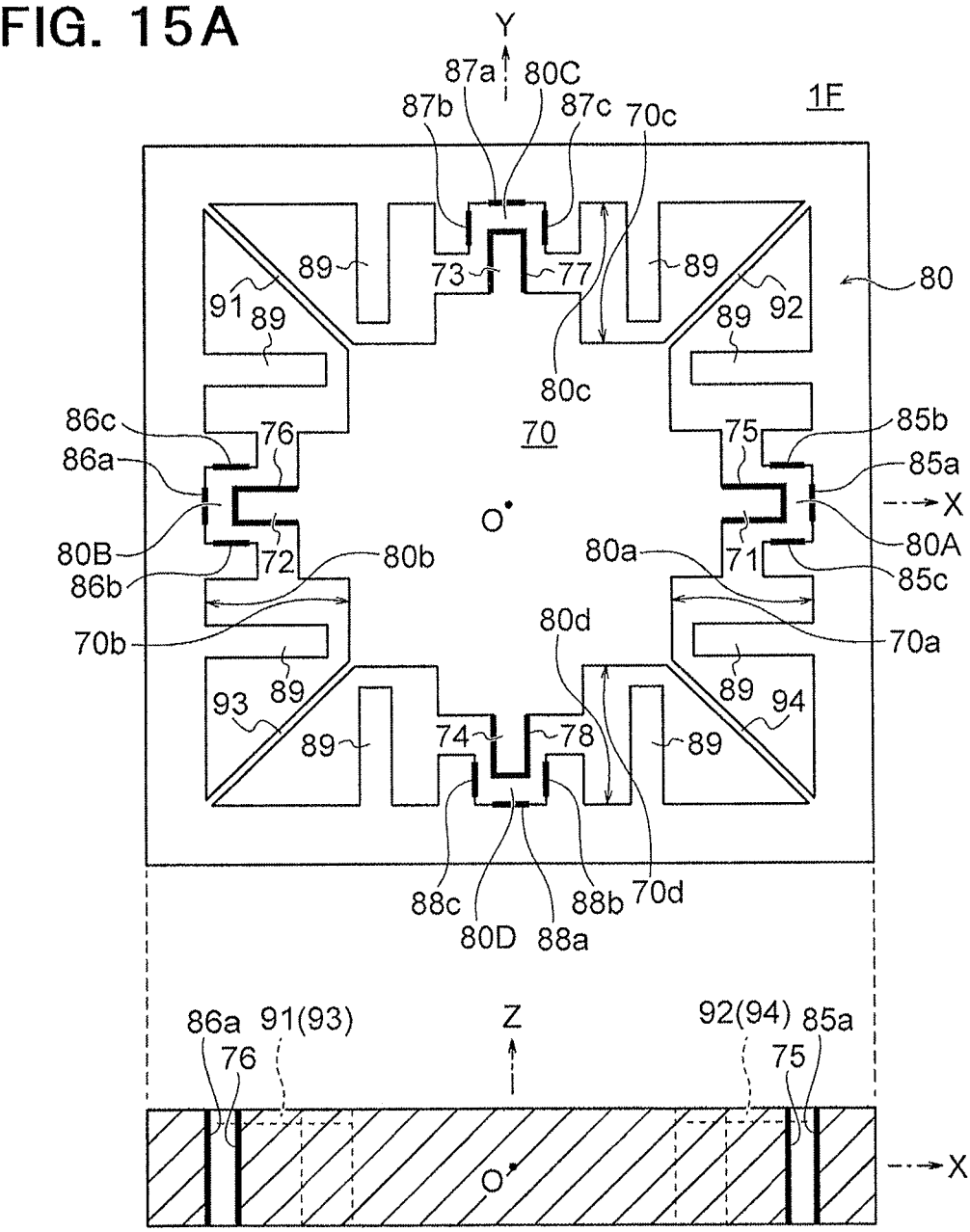
FIG. 15A is a plan view of a power generating element according to a seventh embodiment of the present invention.
FIG. 15B is a sectional view taken along the X axis of FIG. 15A.

As shown in FIG. 15A, the top surface of the displacement convex section 71 and the bottom surface of the fixed concave section 80A are oppose to each other. The electret material layer 75 is formed on one of the opposed surfaces. An end counter electrode layer 85a (a first end counter electrode layer) is formed on the other. In this embodiment, the electret material layer 75 is formed on the top surface, the left side surface, and the right side surface of the displacement convex section 71 via an electret electrode layer (not shown in FIG. 15A). The end counter electrode layer 85a is formed on the bottom surface of the fixed concave section 80A.

The left side surface of the displacement convex section 71 and the left side surface of the fixed concave section 80A are opposed to each other. The electret material layer 75 is formed on one of the opposed surfaces. A left side counter electrode layer 85b (a first left side counter electrode layer) is formed on the other. In this embodiment, the left side counter electrode layer 85b is formed on the left side surface of the fixed concave section 80A.

Note that the left side surface of the displacement convex section 71 is the side surface on the left side of the displacement convex section 71 when viewed in a direction in which the displacement convex section 71 projects (i.e., the X-axis positive direction). The left side surface of the fixed concave section 80A is a side surface opposed to the left side surface of the displacement convex section 71. The right side surface of the displacement convex section 71 is the side surface on the right side of the displacement convex section 71 when viewed in the direction in which the displacement convex section 71 projects. The right side surface of the fixed concave section 80A is the side surface opposed to the right side surface of the displacement convex section 71. The same applies to the description of "left" and "right" in the embodiment explained below.

The right side surface of the displacement convex section 71 and the right side surface of the fixed concave section 80A are opposed to each other. The electret material layer 75 is formed on one of the opposed surfaces. A right side counter electrode layer 85c (a first right side counter electrode layer) is formed on the other. In this embodiment, the right side counter electrode layer 85c is formed on the right side surface of the fixed concave section 80A.

The end counter electrode layer 85a, the left side counter electrode layer 85b, and the right side counter electrode layer 85c are respectively electrically connected to peculiar pads (not shown in FIG. 15A).

The displacement convex section 72 and the fixed concave section 80B, the displacement convex section 73 and the fixed concave section 80C, and the displacement convex section 74 and the fixed concave section 80D have the same configuration as explained below.

The top surface of the displacement convex section 72 and the bottom surface of the fixed concave section 80B are opposed to each other. The electret material layer 76 is formed on one of the opposed surfaces. An end counter electrode layer 86a (a second end counter electrode layer) is formed on the other. The left side surface of the displacement convex section 72 and the left side surface of the fixed concave section 80B are opposed to each other. The electret material layer 76 is formed on one of the opposed surfaces. A left side counter electrode layer 86b (a second left side counter electrode layer) is formed on the other. The right side surface of the displacement convex section 72 and the right side surface of the fixed concave section 80B are opposed to each other. The electret material layer 76 is formed on one of the opposed surfaces. A right side counter electrode layer 86c (a second right side counter electrode layer) is formed on the other.

The top surface of the displacement convex section 73 and the bottom surface of the fixed concave section 80C are opposed to each other. The electret material layer 77 is formed on one of the opposed surfaces. An end counter electrode layer 87a (a third end counter electrode layer) is formed on the other. The left side surface of the displacement convex section 73 and the left side surface of the fixed concave section 80C are opposed to each other. The electret material layer 77 is formed on one of the opposed surfaces. A left side counter electrode layer 87b (a third left side counter electrode layer) is formed on the other. The right side surface of the displacement convex section 73 and the right side surface of the fixed concave section 80C are opposed to each other. The electret material layer 77 is formed on one of the opposed surfaces. A right side counter electrode layer 87c (a third right side counter electrode layer) is formed on the other.

The top surface of the displacement convex section 74 and the bottom surface of the fixed concave section 80D are opposed to each other. The electret material layer 78 is formed on one of the opposed surfaces. An end counter electrode layer 88a (a fourth end counter electrode layer) is formed on the other. The left side surface of the displacement convex section 74 and the left side surface of the fixed concave section 80D are opposed to each other. The electret material layer 78 is formed on one of the opposed surfaces. A left side counter electrode layer 88b (a fourth left side counter electrode layer) is formed on the other. The right side surface of the displacement convex section 74 and the right side surface of the fixed concave section 80D are opposed to each other. The electret material layer 78 is formed on one of the opposed surfaces. A right side counter electrode layer 88c (a fourth right side counter electrode layer) is formed on the other.

As shown in FIG. 15A, in the power generating element 1F according to this embodiment, the end counter electrode layers 85a to 88a, the left side counter electrode layers 85b to 88b, and the right side counter electrode layers 85c to 88c form individual electrode layers electrically independent from one another. For example, concerning the fixed concave section 80A, it is understood that the counter electrode layer 85 in the sixth embodiment is divided into the three individual counter electrode layers 85a, 85b, and 85c. The counter electrode layers are insulated and separated by silicon oxide films or the like formed on a silicon substrate.

The operation of the power generating element 1F according to the seventh embodiment is explained.

Figure 16A:
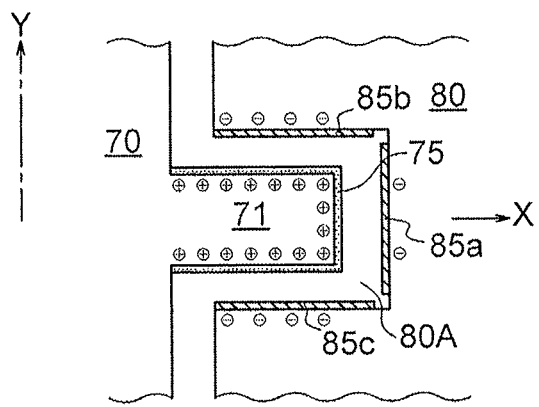
FIGS. 16A, 16B, and 16C are plan views for explaining the operation of the power generating element according to the seventh embodiment.

FIG. 16A is an enlarged plan view of a region including the displacement convex section 71 and the fixed concave section 80A at the time when the center of the tabular structure 70 is located in the origin O of the XYZ three-dimensional orthogonal coordinate system. The electret material layer 75 is positively charged. Negative electric charges are induced to each of the end counter electrode layer 85a, the left side counter electrode layer 85b, and the right side counter electrode layer 85c.

Figure 16B:
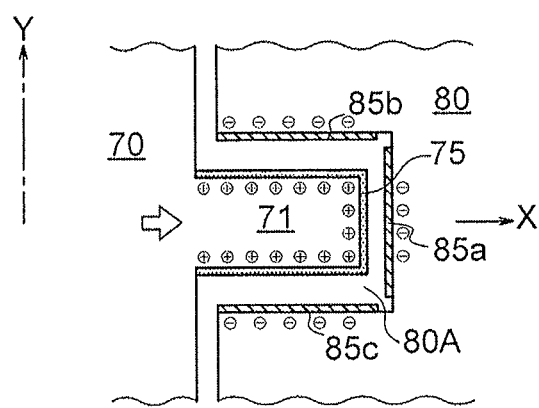

First, the operation of the power generating element 1F performed when the tabular structure 70 vibrates in the X-axis direction is explained. When the tabular structure 70 is displaced in the +X-axis direction, the inter-layer distance between the electret material layer 75 in the top surface portion of the displacement convex section 71 and the end counter electrode layer 85a decreases. Consequently, as shown in FIG. 16B, electric charges induced to the end counter electrode layer 85a increase. An overlapping area between the electret material layer 75 on the left side surface portion of the displacement convex section 71 and the left side counter electrode layer 85b and an overlapping area between the electret material layer 75 in the right side surface portion of the displacement convex section 71 and the right side counter electrode layer 85c increase. As a result, as shown in FIG. 16B, electric charges induced to the left side counter electrode layer 85b and the right side counter electrode layer 85c increase.

When the tabular structure 70 is displaced in the −X-axis direction, contrary to when the tabular structure 70 is displaced in the +X-axis direction, all electric charges induced to the end counter electrode layer 85a, the left side counter electrode layer 85b, and the right side counter electrode layer 85c decrease. In this way, when the tabular structure 70 vibrates in the X-axis direction, the power generating operation of the power generating element 1F is the same as the power generating operation of the power generating element 1E according to the sixth embodiment concerning the X-axis direction.

Figure 16C:
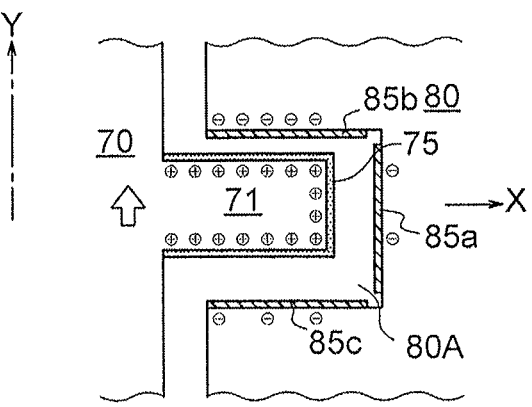

The operation of the power generating element 1F performed when the tabular structure 70 vibrates in the Y-axis direction is explained. When the tabular structure 70 is displaced in the +Y-axis direction, as shown in FIG. 16C, the inter-layer distance between the electret material layer 75 in the top surface portion of the displacement convex section 71 and the end counter electrode layer 85a does not change. Therefore, the number of electric charges induced to the end counter electrode layer 85a does not change. The power generation based on fluctuation in the inter-layer distances is not performed. The same applies when the tabular structure 70 is displaced in the −Y-axis direction. The power generation based on fluctuation in the inter-layer distances is not performed.

When the tabular structure 70 is displaced in the +Y-axis direction, as shown in FIG. 16C, the inter-layer distance between the electret material layer 75 in the left side surface portion of the displacement convex section 71 and the left side counter electrode layer 85b decreases. Therefore, electric charges induced to the left side counter electrode layer 85b increase. On the other hand, the inter-layer distance between the electret material layer 75 in the right side surface portion of the displacement convex section 71 and the right side counter electrode layer 85*c* increases. Therefore, electric charges induced to the right side counter electrode layer 85*c* decrease. Conversely, when the tabular structure 70 is displaced in the −Y-axis direction, electric charges induced to the left side counter electrode layer 85*b* decrease and electric charges induced to the right side counter electrode layer 85*c* increase. In the sixth embodiment, since the left side counter electrode layer 85*b* and the right side counter electrode layer 85*c* are electrically connected, the increase and the decrease of the number of electric charges are cancelled. On the other hand, in the seventh embodiment, since the left side counter electrode layer 85*b* and the right side counter electrode layer 85*c* are electrically separated, the power generating element 1F can receive vibration in the Y-axis direction and perform power generation in the fixed concave section 80A.

As it is understood from the above, the power generating element 1F according to this embodiment can perform power generation using not only vibration in the X-axis direction but also vibration in the Y-axis direction in the fixed concave sections 80A and 80B. More in detail, when the tabular structure 70 vibrates in the X-axis direction, the power generating element 1F can perform the power generation based on fluctuation in the inter-layer distances and the overlapping areas as explained with reference to FIG. 16B. When the tabular structure 70 is displaced in the Y-axis direction, the power generating element 1F can perform the power generation based on fluctuation in the inter-layer distances as explained with reference to FIG. 16C.

Similarly, the power generating element 1F according to this embodiment can perform power generation using not only vibration in the Y-axis direction but also vibration in the X-axis direction in the fixed concave sections 80C and 80D.

As in the sixth embodiment, when the tabular structure 70 vibrates in the Z-axis direction, the power generating element 1F can also perform the power generation based on fluctuation in the overlapping areas in the fixed concave sections 80A to 80D.

Therefore, according to the seventh embodiment, it is possible to perform more efficient power generation compared with the sixth embodiment.

Modification 1 of the Seventh Embodiment

Figure 17A:
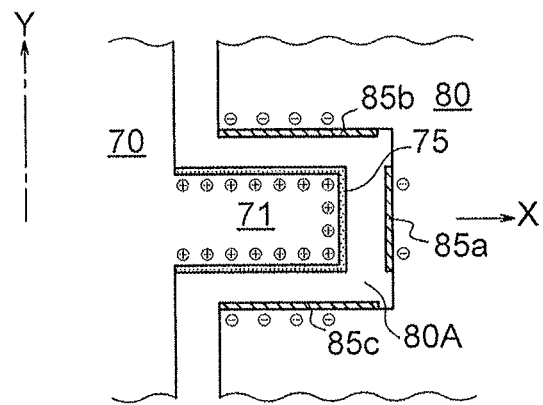
FIG. 17A is a plan view showing a part of a power generating element according to a modification 1 of the seventh embodiment of the present invention.

In a modification 1, as shown in FIG. 17A, the width of the end counter electrode layer 85*a* is substantially equal to the width of the electret material layer 75 formed on the top surface of the displacement convex section 71. Consequently, when the tabular structure 70 vibrates in the Y-axis direction, since the overlapping area between the end counter electrode layer 85*a* and the electret material layer 75 fluctuates, electric charges induced to the end counter electrode layer 85*a* fluctuate. Therefore, according to this modification, it is possible to extract electric power from the end counter electrode layer 85*a* as well.

Modification 2 of the Seventh Embodiment

Figure 17B:
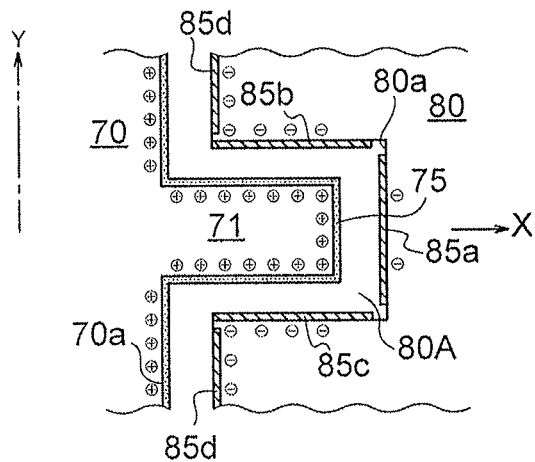
FIG. 17B is a plan view showing a part of a power generating element according to a modification 2 of the seventh embodiment of the present invention.

In a modification 2, an electret material layer is also formed in a portion other than the displacement convex section on the displacement outer surface of the tabular structure 70. For example, as shown in FIG. 17B, the electret material layer 75 is also formed in a portion other than the top surface and both the left and right side surfaces of the displacement convex section 71. A plane section counter electrode layer 85*d* is formed on the fixed inner surface 80*a* according to the formation of the electret material layer 75. The plane section counter electrode layer 85*d* is electrically connected to a peculiar pad (not shown in FIG. 17B). According to this modification, it is possible to further increase the power generation amount.

Eighth Embodiment

A power generating element 1G according to an eighth embodiment is explained. One of differences from the sixth embodiment is that a fixed convex section of the frame-like structure 80 is housed in a displacement concave section provided in the tabular structure 70. The eighth embodiment is explained below centering on the differences.

Figure 18A:
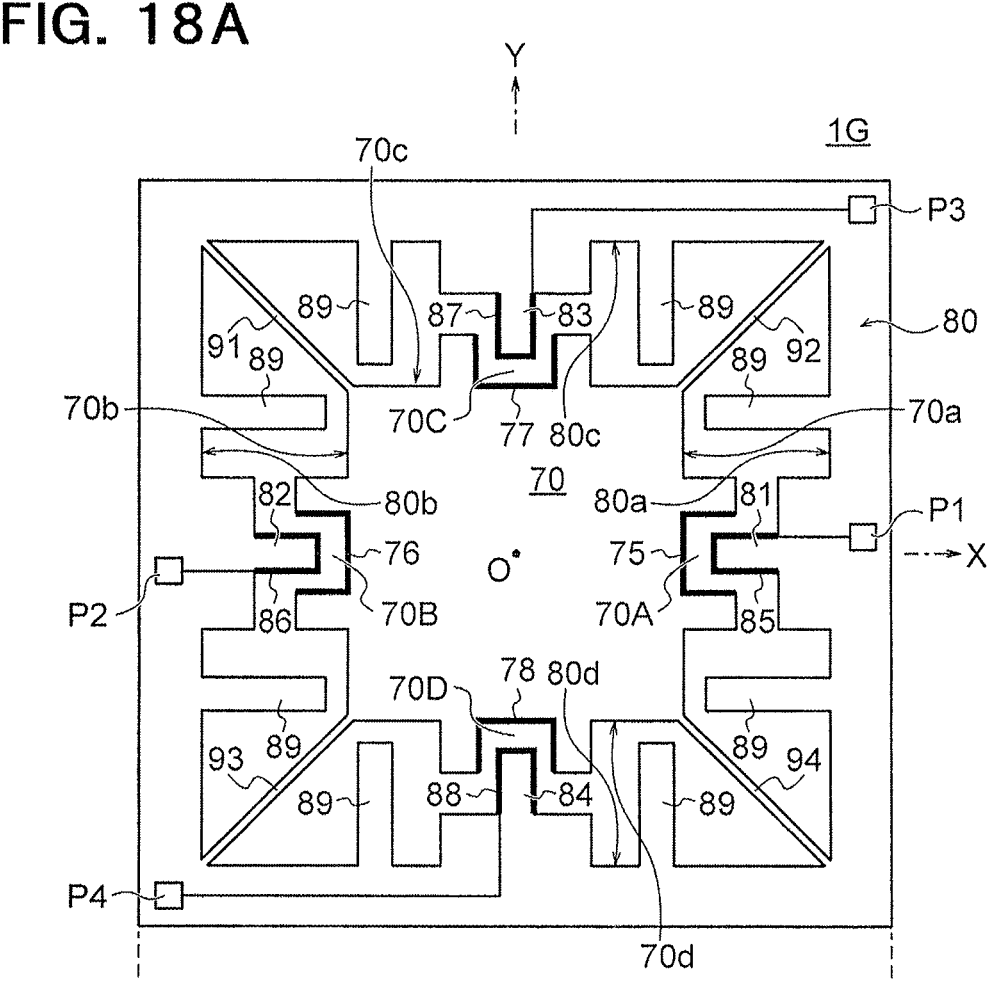
FIG. 18A is a plan view of a power generating element according to an eighth embodiment of the present invention.
Figure 18B:
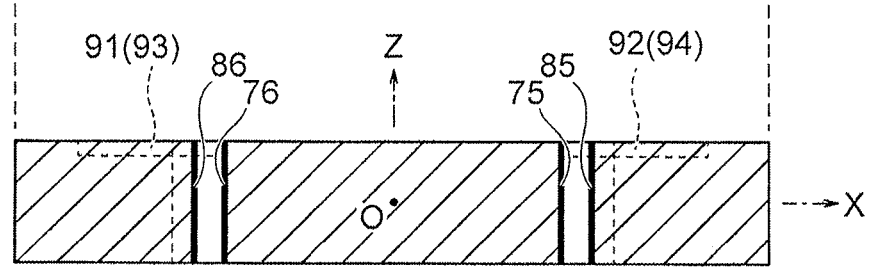
FIG. 18B is a sectional view taken along the X axis of FIG. 18A.

The power generating element 1G according to the eighth embodiment includes, as shown in FIGS. 18A and 18B, the tabular structure 70 functioning as a displacement member, the frame-like structure 80 functioning as a fixed member, and the elastic deformation bodies 91 to 94 that connect the tabular structure 70 and the frame-like structure 80.

As shown in FIG. 18A, the fixed convex sections 81 to 84 are respectively provided on the fixed inner surfaces 80*a* to 80*d* of the frame-like structure 80. More in detail, the fixed convex section 81 (a first fixed convex section) projecting in the X-axis negative direction is provided on the fixed inner surface 80*a*. The fixed convex section 82 (a second fixed convex section) projecting in the X-axis positive direction is provided on the fixed inner surface 80*b*. The fixed convex section 83 (a third fixed convex section) projecting in the Y-axis negative direction is provided on the fixed inner surface 80*c*. The fixed convex section 84 (a fourth fixed convex section) projecting in the Y-axis positive direction is provided on the fixed inner surface 80*d*.

Displacement concave sections 70A to 70D are respectively provided on the displacement outer surfaces 70*a* to 70*d* of the tabular structure 70. More in detail, the displacement concave section 70A (a first displacement concave section) that houses the fixed convex section 81 is provided on the displacement outer surface 70*a*. The displacement concave section 706 (a second displacement concave section) that houses the fixed convex section 82 is provided on the displacement outer surface 70*b*. The displacement concave section 70C (a third displacement concave section) that houses the fixed convex section 83 is provided on the displacement outer surface 70*c*. The displacement concave section 70D (a fourth displacement concave section) that houses the fixed convex section 84 is provided on the displacement outer surface 70*d*.

As shown in FIG. 18A, the top surface and the side surface of the fixed convex section 81 and the bottom surface and the side surface of the displacement concave section 70A are opposed to each other. That is, the top surface of the fixed convex section 81 and the bottom surface of the displacement concave section 70A are opposed and the side surface of the fixed convex section 81 and the side surface of the displacement concave section 70A are opposed. The electret material layer 75 is formed on one of the opposed surfaces. The counter electrode layer 85 is formed on the other. In this embodiment, the counter electrode layer 85 is formed on the top surface and the side surface of the fixed convex section 81. The electret material layer 75 is formed on the bottom surface and the side surface of the displacement concave section 70A via an electret electrode layer (not shown in FIG. 18A).

Similarly, the top surface and the side surface of the fixed convex section 82 and the bottom surface and the side surface of the displacement concave section 70B are opposed to each other. The electret material layer 76 is formed on one of the opposed surfaces. The counter electrode layer 86 is formed on the other. In this embodiment, the counter electrode layer 86 is formed on the top surface and the side surface of the fixed convex section 82. The electret material layer 76 is formed on the bottom surface and the side surface of the displacement concave section 70B via an electret electrode layer (not shown in FIG. 18A).

The top surface and the side surface of the fixed convex section 83 and the bottom surface and the side surface of the displacement concave section 70C are opposed to each other. The electret material layer 77 is formed on one of the opposed surfaces. The counter electrode layer 87 is formed on the other. In this embodiment, the counter electrode layer 87 is formed on the top surface and the side surface of the fixed convex section 83. The electret material layer 77 is formed on the bottom surface and the side surface of the displacement concave section 70C via an electret electrode layer (not shown in FIG. 18A).

The top surface and the side surface of the fixed convex section 84 and the bottom surface and the side surface of the displacement concave section 70D are opposed to each other. The electret material layer 78 is formed on one of the opposed surfaces. The counter electrode layer 88 is formed on the other. In this embodiment, the counter electrode layer 88 is formed on the top surface and the side surface of the fixed convex section 84. The electret material layer 78 is formed on the bottom surface and the side surface of the displacement concave section 70D via an electret electrode layer (not shown in FIG. 18A).

The operation of the power generating element 1G according to the eighth embodiment is explained.

When the tabular structure 70 is displaced in the +X-axis direction, the displacement concave section 70A houses the fixed convex section 81 more. The displacement concave section 70B houses the fixed convex section 82 less. Consequently, the inter-layer distance between the electret material layer 75 in the bottom surface portion of the displacement concave section 70A and the counter electrode layer 85 in the top surface portion of the fixed convex section 81 decreases. The inter-layer distance between the electret material layer 76 in the bottom surface portion of the displacement concave section 70B and the counter electrode layer 86 in the top surface portion of the fixed convex section 82 increases. As a result, electric charges induced to the counter electrode layer 85 increase and electric charges induced to the counter electrode layer 86 decrease. Conversely, when the tabular structure 70 is displaced in the –X-axis direction, electric charges induced to the counter electrode layer 85 decrease and electric charges induced to the counter electrode layer 86 increase.

When the tabular structure 70 vibrates in the X-axis direction, power generation is performed by fluctuation in overlapping areas as well. More in detail, when the tabular structure 70 is displaced in the +X-axis direction, an overlapping area between the electret material layer 75 in the side surface portion of the displacement concave section 70A and the counter electrode layer 85 in the side surface portion of the fixed convex section 81 increases. Therefore, electric charges induced to the counter electrode layer 85 in the side surface portion of the fixed convex section 81 increase. On the other hand, an overlapping area between the electret material layer 76 in the side surface portion of the displacement concave section 70B and the counter electrode layer 86 in the side surface portion of the fixed convex section 82 decreases. Therefore, electric charges induced to the counter electrode layer 86 in the side surface portion of the fixed convex section 82 decrease.

Therefore, when the tabular structure 70 is displaced in the +X-axis direction, electric charges induced to the counter electrode layer 85 increase according to fluctuation in the inter-layer distances and the overlapping areas. On the other hand, electric charges induced to the counter electrode layer 86 decrease. Therefore, electric charges are taken into the inside of the power generating element 1G from the pad P1 and electric charges are extracted to the outside of the power generating element 1G from the pad P2. Conversely, when the tabular structure 70 is displaced in the –X-axis direction, electric charges induced to the counter electrode layer 85 decrease and electric charges induced to the counter electrode layer 86 increase. Therefore, electric charges are extracted to the outside of the power generating element 1G from the pad P1 and electric charges are taken into the inside of the power generating element 1G from the pad P2.

Note that, when the tabular structure 70 vibrates in the Y-axis direction, the power generating element 1G performs power generation according to the same operation principle as the operation principle in the case of the vibration in the X-axis direction.

When the tabular structure 70 vibrates in the Z-axis direction, the power generating element 1G performs the power generation based on fluctuation in the overlapping areas in the fixed convex sections 81 to 84.

As explained above, in the power generating element 1G, when the tabular structure 70 vibrates in the X-axis direction, the power generation based on fluctuation in the inter-layer distances and the overlapping areas is performed and electric power is extracted from the pads P1 and P2. When the tabular structure 70 vibrates in the Y-axis direction, the power generation based on fluctuation in the inter-layer distances and the overlapping areas is performed and electric power is extracted from the pads P3 and P4.

Note that, as in the power generating element 1E according to the sixth embodiment, when the tabular structure 70 vibrates in the X-axis direction, since power generation by the fixed convex sections 83 and 84 is not performed, electric power is not extracted from the pads P3 and P4. Similarly, when the tabular structure 70 vibrates in the Y-axis direction, since power generation by the fixed convex sections 81 and 82 is not performed, electric power is not extracted from the pads P1 and P2.

As explained above, the power generating element 1G according to the eighth embodiment performs the power generation based on fluctuation in the inter-layer distances and the overlapping areas concerning the X-axis direction according to the vibration in the X-axis direction of the tabular structure 70. Similarly, the power generating element 1G performs the power generation based on fluctuation in the inter-layer distances and the overlapping areas concerning the Y-axis direction according to the vibration in the Y-axis direction of the tabular structure 70. Further, the power generating element 1G performs the power generation based on fluctuation in the overlapping areas concerning side surfaces of the frame-like structure 80 according to the vibration in the Z-axis direction of the tabular structure 70. Therefore, according to the eighth embodiment, it is possible to perform markedly efficient power generation compared with the power generating element in the past.

Ninth Embodiment

A power generating element 1H according to a ninth embodiment is explained. One of differences from the eighth embodiment is that a counter electrode layer is individually provided on each of the top surface, the left side surface, and the right side surface of a fixed convex section. The ninth embodiment is explained below centering on the differences.

Figures 19A, 19B:
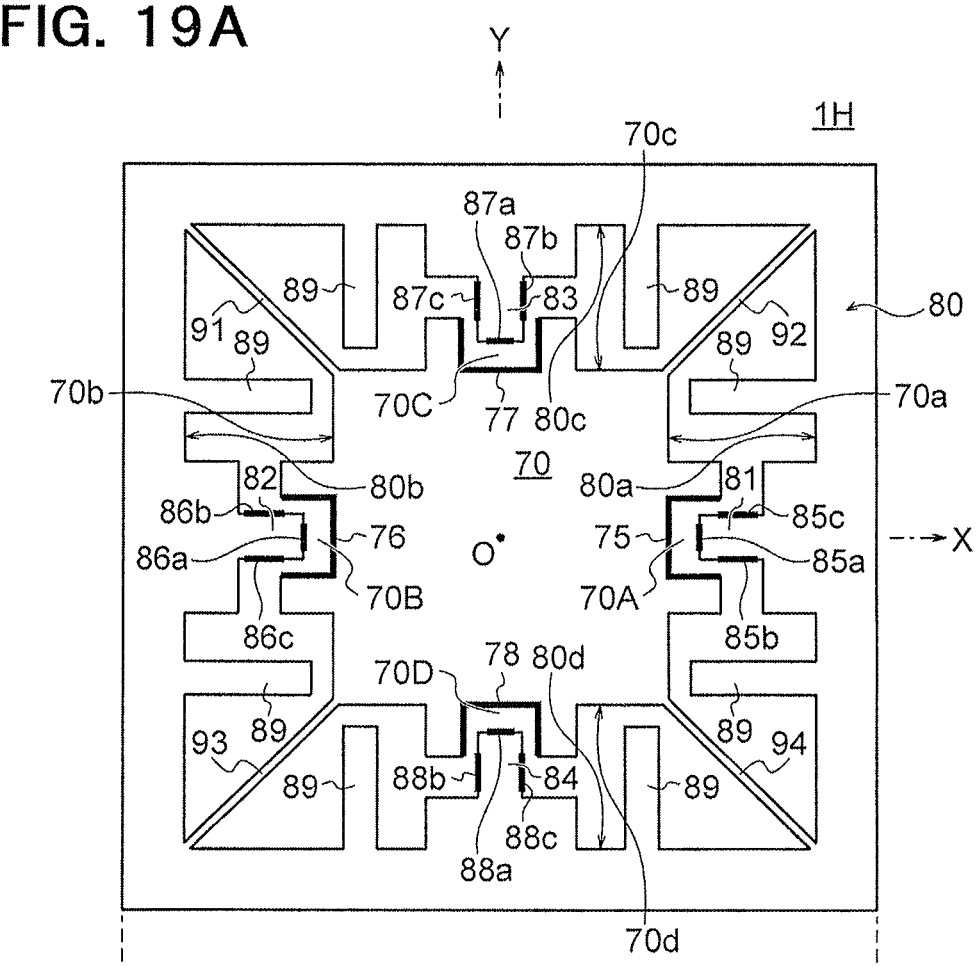
FIG. 19A is a plan view of a power generating element according to a ninth embodiment of the present invention.
FIG. 19B is a sectional view taken along the X axis of FIG. 19A.

As shown in FIG. 19A, the top surface of the fixed convex section 81 and the bottom surface of the displacement concave section 70A are opposed to each other. The electret material layer 75 is formed on one of the opposed surfaces. The end counter electrode layer 85a is formed on the other. In this embodiment, the electret material layer 75 is formed on the bottom surface, the left side surface, and the right side surface of displacement concave section 70A via an electret electrode layer (not shown in FIG. 19A). The end counter electrode layer 85a is formed on the top surface of the fixed convex section 81.

The left side surface of the fixed convex section 81 and the left side surface of the displacement concave section 70A are opposed to each other. The electret material layer 75 is formed on one of the opposed surfaces. The left side counter electrode layer 85b is formed on the other. In this embodiment, the left side counter electrode layer 85b is formed on the left side surface of the fixed convex section 81.

Note that the left side surface of the fixed convex section 81 is the side surface on the left side of the fixed convex section 81 when viewed in a direction in which the fixed convex section 81 projects (i.e., the X-axis negative direction).

The left side surface of the fixed convex section 81 is the side surface on the left side of the fixed convex section 81 when viewed in a direction in which the fixed convex section 81 projects (i.e., the X-axis negative direction). The left side surface of the displacement concave section 70A is the side surface opposed to the left side surface of the fixed convex section 81. The right side surface of the fixed convex section 81 is the side surface on the right side of the fixed convex section 81 when viewed in the direction in which the fixed convex section 81 projects. The right side surface of the displacement concave section 70A is the side surface opposed to the right side surface of the fixed convex section 81. The same applies to the description of "left" and "right" in the embodiment explained below.

The right side surface of the fixed convex section 81 and the right side surface of the displacement concave section 70A are opposed to each other. The electret material layer 75 is formed on one of the opposed surfaces. The right side counter electrode layer 85c is formed on the other. In this embodiment, the right side counter electrode layer 85c is formed on the right side surface of the fixed convex section 81.

The end counter electrode layer 85a, the left side counter electrode layer 85b, and the right side counter electrode layer 85c are respectively electrically connected to peculiar pads (not shown in FIG. 19A).

The displacement concave section 70B and the fixed convex section 82, the displacement concave section 70C and the fixed convex section 83, and the displacement concave section 70D and the fixed convex section 84 have the same configuration as explained below.

The top surface of the fixed convex section 82 and the bottom surface of the displacement concave section 70B are opposed to each other. The electret material layer 76 is formed on one of the opposed surfaces. The end counter electrode layer 86a is formed on the other. The left side surface of the fixed convex section 82 and the left side surface of the displacement concave section 70B are opposed to each other. The electret material layer 76 is formed on one of the opposed surfaces. The left side counter electrode layer 86b is formed on the other. The right side surface of the fixed convex section 82 and the right side surface of the displacement concave section 70B are opposed to each other. The electret material layer 76 is formed on one of the opposed surfaces. The right side counter electrode layer 86c is formed on the other.

The top surface of the fixed convex section 83 and the bottom surface of the displacement concave section 70C are opposed to each other. The electret material layer 77 is formed on one of the opposed surfaces. The end counter electrode layer 87a is formed on the other. The left side surface of the fixed convex section 83 and the left side surface of the displacement concave section 70C are opposed to each other. The electret material layer 77 is formed on one of the opposed surfaces. The left side counter electrode layer 87b is formed on the other. The right side surface of the fixed convex section 83 and the right side surface of the displacement concave section 70C are opposed to each other. The electret material layer 77 is formed on one of the opposed surfaces. The right side counter electrode layer 87c is formed on the other.

The top surface of the fixed convex section 84 and the bottom surface of the displacement concave section 70D are opposed to each other. The electret material layer 78 is formed on one of the opposed surfaces. The end counter electrode layer 88a is formed on the other. The left side surface of the fixed convex section 84 and the left side surface of the displacement concave section 70D are opposed to each other. The electret material layer 78 is formed on one of the opposed surfaces. The left side counter electrode layer 88b is formed on the other. The right side surface of the fixed convex section 84 and the right side surface of the displacement concave section 70D are opposed to each other. The electret material layer 78 is formed on one of the opposed surfaces. The right side counter electrode layer 88c is formed on the other.

As shown in FIG. 19A, in the power generating element 1H according to this embodiment, the end counter electrode layers 85a to 88a, the left side counter electrode layers 85b to 88b, and the right side counter electrode layers 85c to 88c form individual electrode layers electrically independent from one another. For example, concerning the fixed convex section 81, it is understood that the counter electrode layer 85 in the eighth embodiment is divided into the three individual counter electrode layers 85a, 85b, and 85c.

The operation of the power generating element 1H according to the ninth embodiment is explained.

Figure 20A:
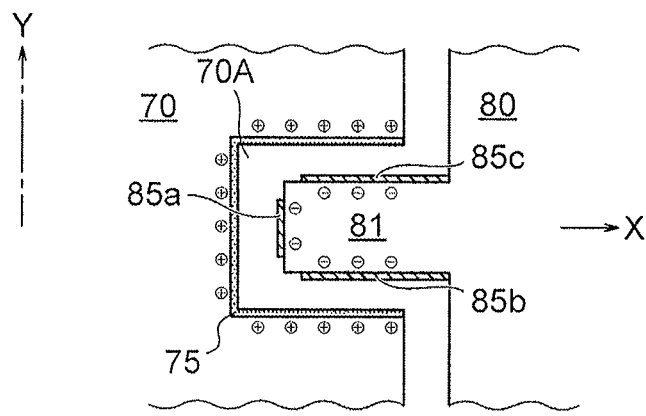
FIGS. 20A, 20B, and 20C are-plan views for explaining the operation of the power generating element according to the ninth embodiment.

FIG. 20A is an enlarged plan view of a region including the displacement concave section 70A and the fixed convex section 81 at the time when the center of the tabular structure 70 is located in the origin O of the XYZ three-dimensional orthogonal coordinate system. The electret material layer 75 is positively charged. Negative electric charges are induced to each of the end counter electrode layer 85a, the left side counter electrode layer 85b, and the right side counter electrode layer 85c.

Figure 20B:
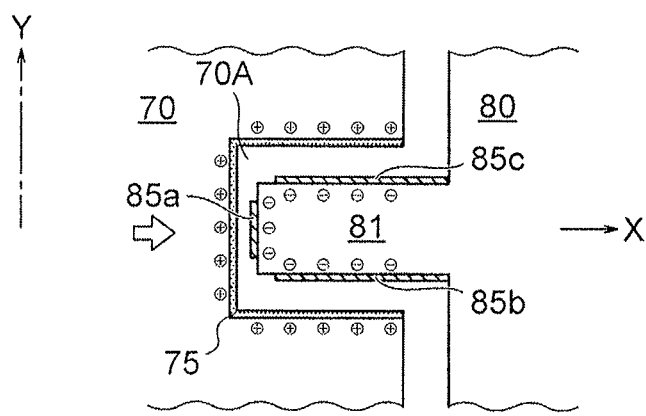

First, the operation of the power generating element 1H performed when the tabular structure 70 vibrates in the X-axis direction is explained. When the tabular structure 70 is displaced in the +X-axis direction, the inter-layer distance between the electret material layer 75 in the bottom surface portion of the displacement concave section 70A and the end counter electrode layer 85a decreases. As a result, as shown in FIG. 20B, electric charges induced to the end counter electrode layer 85a increase. An overlapping area between the electret material layer 75 on the left side surface portion of the displacement concave section 70A and the left side counter electrode layer 85b and an overlapping area between the electret material layer 75 in the right side surface portion of the displacement concave section 70A and the right side counter electrode layer 85c increase. As a result, as shown in FIG. 20B, electric charges induced to the left side counter electrode layer 85b and the right side counter electrode layer 85c increase.

When the tabular structure 70 is displaced in the −X-axis direction, contrary to when the tabular structure 70 is displaced in the +X-axis direction, electric charges induced to the end counter electrode layer 85a, the left side counter electrode layer 85b, and the right side counter electrode layer 85c decrease. In this way, when the tabular structure 70 vibrates in the X-axis direction, the power generating operation of the power generating element 1H is the same as the power generating operation of the power generating element 1E according to the sixth embodiment concerning the X-axis direction.

Figure 20C:
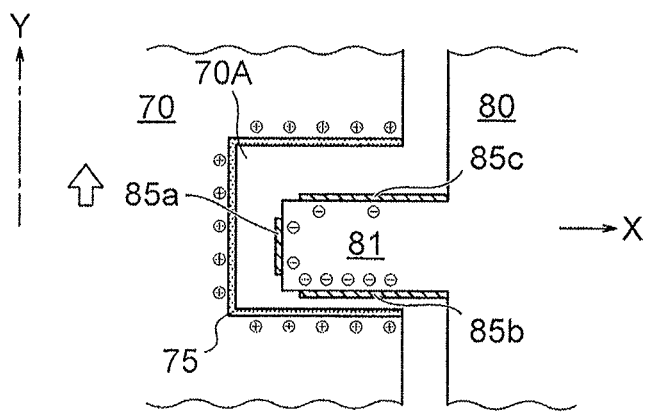

The operation of the power generating element 1H performed when the tabular structure 70 vibrates in the Y-axis direction is explained. When the tabular structure 70 is displaced in the +Y-axis direction, as shown in FIG. 20C, the inter-layer distance between the electret material layer 75 in the bottom surface portion of the displacement concave section 70A and the end counter electrode layer 85a does not change. Therefore, the number of electric charges induced to the end counter electrode layer 85a does not change. The power generation based on fluctuation in the inter-layer distances is not performed. The same applies when the tabular structure 70 is displaced in the −Y-axis direction. The power generation based on fluctuation in the inter-layer distances is not performed.

When the tabular structure 70 is displaced in the +Y-axis direction, as shown in FIG. 20C, the inter-layer distance between the electret material layer 75 in the left side surface portion of the displacement concave section 70A and the left side counter electrode layer 85b decreases. Therefore, electric charges induced to the left side counter electrode layer 85b increase. On the other hand, the inter-layer distance between the electret material layer 75 in the right side surface portion of the displacement convex section 71 and the right side counter electrode layer 85c increases. Therefore, electric charges induced to the right side counter electrode layer 85c decrease. Conversely, when the tabular structure 70 is displaced in the −Y-axis direction, electric charges induced to the left side counter electrode layer 85b decrease and electric charges induced to the right side counter electrode layer 85c increase. In the ninth embodiment, since the left side counter electrode layer 85b and the right side counter electrode layer 85c are electrically separated, the power generating element 1H can receive vibration in the Y-axis direction and perform power generation in the fixed convex section 81.

As it is understood from the above, the power generating element 1H according to this embodiment can perform power generation using not only vibration in the X-axis direction but also vibration in the Y-axis direction in the fixed convex sections 81 and 82. More in detail, when the tabular structure 70 is displaced in the X-axis direction, the power generating element 1H can perform the power generation based on fluctuation in the inter-layer distances and the overlapping areas as explained with reference to FIG. 20B. When the tabular structure 70 is displaced in the Y-axis direction, the power generating element 1H can perform the power generation based on fluctuation in the inter-layer distances as explained with reference to FIG. 20C.

Similarly, the power generating element 1H according to this embodiment can perform power generation using not only vibration in the Y-axis direction but also vibration in the X-axis direction in the fixed convex sections 83 and 84.

As in the sixth embodiment, the power generating element 1H can also perform the power generation based on fluctuation in the overlapping areas in the fixed convex sections 81 to 84 according to vibration in the Z-axis direction of the tabular structure 70.

Therefore, according to the ninth embodiment, it is possible to perform more efficient power generation compared with the eighth embodiment.

As explained above, in the sixth to ninth embodiments, the partially projecting convex section is provided in one of the tabular structure 70 (the displacement member) and the frame-like structure 80 (the fixed member). The concave section that houses the convex section is provided in the other. The top surface of the convex section and the bottom surface of the concave section are opposed to each other. The electret material layer is formed on one of the opposed surfaces. The end counter electrode layer is formed on the other. The left side surface of the convex section and the left side surface of the concave section are opposed to each other. The electret material layer is formed on one of the opposed surfaces. The left side counter electrode layer is formed on the other. The right side surface of the convex section and the right side surface of the concave section are opposed to each other. The electret material layer is formed on one of the opposed surfaces. The right side counter electrode layer is formed on the other. Further, in the seventh and ninth embodiments, the end counter electrode layer, the left side counter electrode layer, and the right side counter electrode layer form individual electrode layers electrically independent from one another.

Tenth Embodiment

A power generating element 1I according to a tenth embodiment is explained. The power generating element 1I has substantially the same configuration as the power generating element 1D explained in the fifth embodiment. However, a weight is provided in the tabular structure 70. The tenth embodiment is explained below centering on differences from the fifth embodiment.

Figures 21A, 21B:
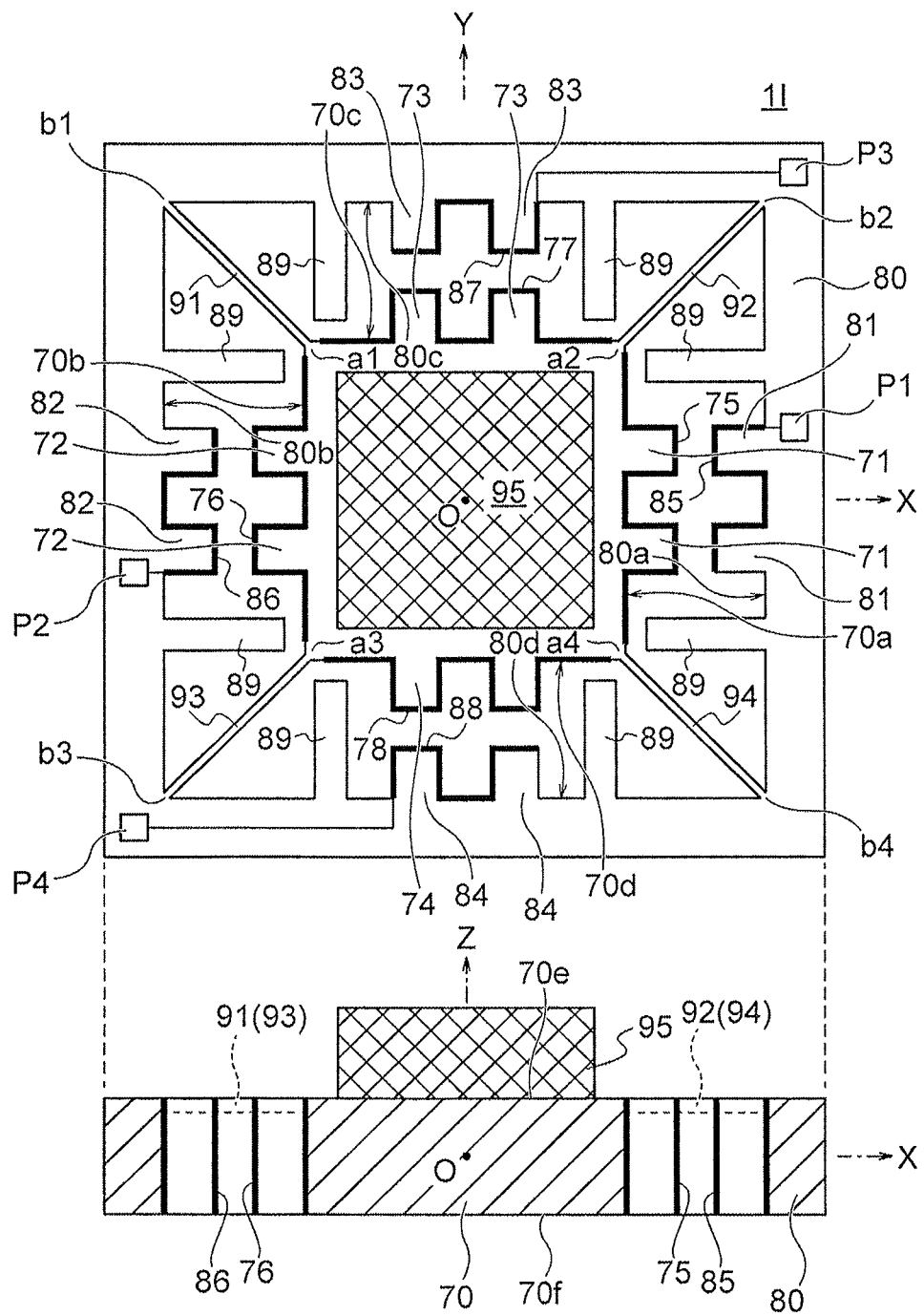
FIG. 21A is a plan view of a power generating element according to a tenth embodiment of the present invention.

The power generating element 1I according to the tenth embodiment includes, as shown in FIGS. 21A and 21B, the tabular structure 70 functioning as a displacement member, the frame-like structure 80 functioning as a fixed member, the elastic deformation bodies 91 to 94 that connect the tabular structure 70 and the frame-like structure 80, and a weight 95.

As shown in FIG. 21B, the weight 95 is joined to the upper surface of the tabular structure 70. The material of the weight 95 is not particularly limited and may be, for example, a semiconductor such as silicon, an insulator such as resin, or metal. A joining method for the weight 95 and the tabular structure 70 is not particularly limited and may be bonding by an adhesive or may be direct joining of semiconductor substrates (wafers).

Note that the weight 95 may be joined to the lower surface of the tabular structure 70. The weight 95 may be joined to both of the upper surface and the lower surface of the tabular structure 70. Generally speaking, the weight 95 only has to be joined to the upper surface or the lower surface, or both of the upper and lower surfaces of the tabular structure 70.

The mass of the tabular structure 70 (the displacement member) of the power generating element 1I is increased by providing the weight 95 in the tabular structure 70 as explained above. Therefore, it is possible to reduce the vibration frequency of the tabular structure 70 without reducing the strength of the elastic deformation bodies 91 to 94. By reducing the vibration frequency, the tabular structure 70 easily resonates with external vibration (environmental vibration, etc.) including a lot of low-frequency components. Therefore, according to the tenth embodiment, it is possible to improve power generation efficiency of the power generating element.

Even if the weight 95 is not provided, it is possible to reduce the vibration frequency of the tabular structure 70 by reducing a spring constant of the elastic deformation bodies 91 to 94. However, the elastic deformation bodies 91 to 94 are disadvantageously broken easily in a manufacturing process or during use of the power generating element.

Figure 22:
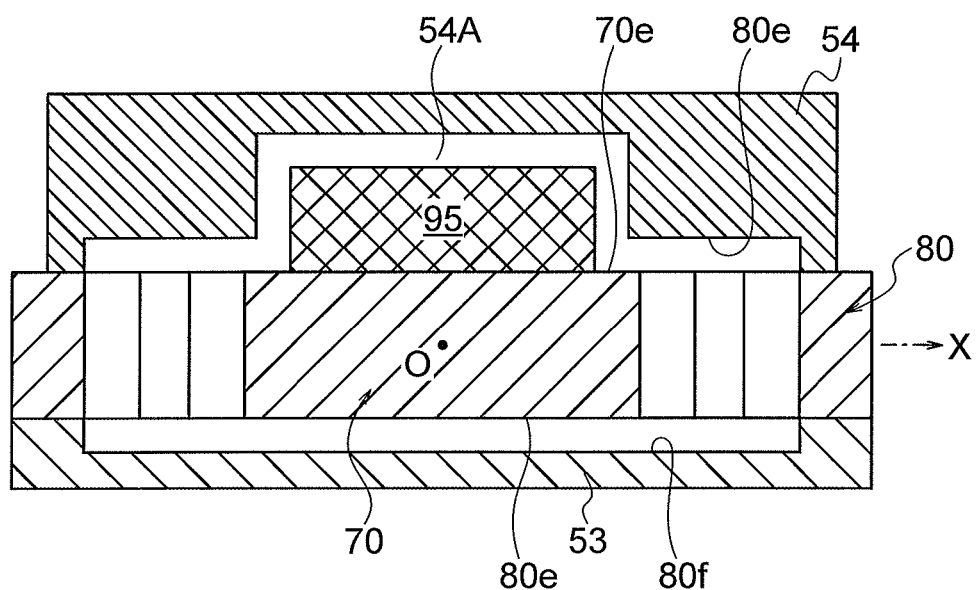
FIG. 22 is a sectional view taken along the X axis of a power generating element according to a modification of the tenth embodiment.

Note that, as shown in FIG. 22, the power generating element 1I may further include an upper lid body 54 that covers an upper part of the tabular structure 70 and a lower lid body 53 that covers a lower part of the tabular structure 70. The upper lid body 54 includes a concave section 54A that houses the weight 95.

The upper lid body 54 and the lower lid body 53 function as stoppers for stopping the tabular structure 70 from vibrating in the Z-axis direction. Consequently, it is possible to prevent the tabular structure 70, in which the weight 95 is provided, from being greatly displaced in the Z-axis direction to damage the elastic deformation bodies 91 to 94.

The fifth to tenth embodiments explained above are not limited to the case in which the tabular structure 70 is configured to be capable of being displaced in all the directions of the X axis, the Y axis, and the Z axis when vibration energy is given to the power generating elements 1D to 1I. That is, the tabular structure 70 may be configured to be capable of being displaced in at least two directions among the X axis, the Y axis, and the Z axis of the XYZ three-dimensional orthogonal coordinate system.

The embodiments of the present invention are explained above. The displacement member (the tabular structure) is not limited to the configurations of the embodiments explained above as long as the displacement member is capable of being displaced in at least two directions among the X axis, the Y axis, and the Z axis. The displacement member may have any configuration.

Those skilled in the art may be able to conceive of additional effects and various modifications of the present invention on the basis of the above description. However, forms of the present invention are not limited to the individual embodiments explained above. Components in different embodiments may be combined as appropriate. Various additions, changes, and partial deletions are possible in a range not departing from the conceptual idea and the spirit of the present invention derived from the contents specified in the claims and equivalents of the contents.

REFERENCE SIGNS LIST 1, 1A, 1B, 1C, 1Ca, 1D, 1Da, 1E, 1F, 1G, 1H, 1I, 1000 power generating element
2 power generation circuit
10, 40 displacement member
11A, 11B, 11C, 11D, 11E electret electrode layer
12A, 12B, 12C, 12D, 12E electret material layer
20, 50, 50A, 50B, 50C, 50D, 50E, 50F fixed member
21A, 21B, 21C, 21D, 21E counter electrode layer
40a, 40b, 40c, 40d, 40e, 40f displacement surface
41 electret electrode layer
42, 42A, 42B, 42C, 42D, 42E, 42F electret material layer
50a, 50b, 50c, 50d, 50e, 50f fixed surface
51, 51A, 51B, 51C, 51D, 51E, 51F counter electrode layer
52, 54 upper lid body
53 lower lid body
55, 56, 57, 58, 59 attachment surface
30, 60, 61, 62, 63, 64, 91, 92, 93, 94, 90A, 90B elastic deformation body
70 tabular structure
70a, 70b, 70c, 70d, 70e, 70f displacement outer surface
70A, 70B, 70C, 70D displacement concave section
71, 72, 73, 74 displacement convex section
75, 76, 77, 78, 79A, 79B electret material layer
80 frame-like structure
80a, 80b, 80c, 80d, 80e, 80f fixed inner surface
80A, 80B, 80C, 80D fixed concave section
81, 82, 83, 84 fixed convex section
85, 86, 87, 88, 89A, 89B counter electrode layer
85a, 86a, 87a, 88a end counter electrode layer
85b, 86b, 87b, 88b left side counter electrode layer
85c, 86c, 87c, 88c right side counter electrode layer
85d plane section counter electrode layer
89 stopper protrusion
95 weight
100 power generating device
200 SOI substrate
201 surface Si layer
202 BOX layer
203 Si substrate
a1, a2, a3, a4 displacement support point
b1, b2, b3, b4 fixed support point
d1, d2, d3 inter-layer distance
C smoothing capacitor
D1, D2, D3, D4 diode
O origin
P1, P2, P3, P4 pad
RL load
S reference plane
T1, T2 output terminal

The invention claimed is:

1. A power generating element comprising: a displacement member; a fixed member; and an elastic deformation body, an electret material layer being formed on a surface of one of the displacement member and the fixed member, and a counter electrode layer opposed to the electret material layer being formed on another surface, and when vibration energy is given to the power generating element, the displacement member being displaced with respect to the fixed member such that an inter-layer distance between the electret material layer and the counter electrode layer fluctuates according to deformation of the elastic deformation body, wherein a partially projecting convex section is provided in one of the displacement member and the fixed member and a concave section configured to house the convex section is provided in another, a top surface of the convex section and a bottom surface of the concave section are opposed to each other, the electret material layer is formed on one of the opposed surfaces, and an end counter electrode layer is formed on another, a left side surface of the convex section and a left side surface of the concave section are opposed to each other, the electret material layer is formed on one of the opposed surfaces, and a left side counter electrode layer is formed on another, and a right side surface of the convex section and a right side surface of the concave section are opposed to each other, the electret material layer is formed on one of the opposed surfaces, and a right side counter electrode layer is formed on another.

2. The power generating element according to claim 1, wherein the end counter electrode layer, the left side counter electrode layer, and the right side counter electrode layer form individual electrode layers electrically independent from one another.

3. A power generating device comprising:
the power generating element according to claim 1, the electret material layer being formed on a surface of the displacement member or the fixed member via an electret electrode layer formed in a lower layer of the electret material layer; and
a power generation circuit configured to generate electric power on the basis of a voltage generated between the counter electrode layer and the electret electrode layer.

4. A power generating element comprising: a displacement member; a fixed member; and an elastic deformation body,
an electret material layer being formed on a surface of one of the displacement member and the fixed member, and a counter electrode layer opposed to the electret material layer being formed on another surface, and
when vibration energy is given to the power generating element, the displacement member being displaced with respect to the fixed member such that an interlayer distance between the electret material layer and the counter electrode layer fluctuates according to deformation of the elastic deformation body,
wherein the displacement member is configured to be capable of being displaced in at least two directions among an X axis, a Y axis, and a Z axis of an XYZ three-dimensional orthogonal coordinate system fixed with respect to the fixed member when the vibration energy is given to the power generating element,
and wherein the displacement member is configured by a tabular structure including an upper surface and a lower surface parallel to an XY plane, and the fixed member is configured by a frame-like structure disposed to surround the tabular structure,
and wherein when the XYZ three-dimensional orthogonal coordinate system is defined such that an origin is arranged in a center position of the displacement member in a state in which displacement does not occur,
the tabular structure includes a first displacement outer surface orthogonal to a positive region of the X axis, a second displacement outer surface orthogonal to a negative region of the X axis, a third displacement outer surface orthogonal to a positive region of the Y axis, and a fourth displacement outer surface orthogonal to a negative region of the Y axis, and
the frame-like structure includes a first fixed inner surface orthogonal to the positive region of the X axis and opposed to the first displacement outer surface, a second fixed inner surface orthogonal to the negative region of the X axis and opposed to the second displacement outer surface, a third fixed inner surface orthogonal to the positive region of the Y axis and opposed to the third displacement outer surface, and a fourth fixed inner surface orthogonal to the negative region of the Y axis and opposed to the fourth displacement outer surface,
and wherein a first displacement convex section projecting in an X-axis positive direction is provided on the first displacement outer surface,
a second displacement convex section projecting in an X-axis negative direction is provided on the second displacement outer surface,
a third displacement convex section projecting in a Y-axis positive direction is provided on the third displacement outer surface,
a fourth displacement convex section projecting in a Y-axis negative direction is provided on the fourth displacement outer surface,
a first fixed convex section projecting in the X-axis negative direction is provided in a position opposed to the first displacement convex section on the first fixed inner surface,
a second fixed convex section projecting in the X-axis positive direction is provided in a position opposed to the second displacement convex section on the second fixed inner surface,
a third fixed convex section projecting in the Y-axis negative direction is provided in a position opposed to the third displacement convex section on the third fixed inner surface,
a fourth fixed convex section projecting in the Y-axis positive direction is provided in a position opposed to the fourth displacement convex section on the fourth fixed inner surface,
a top surface of the first displacement convex section and a top surface of the first fixed convex section are opposed to each other, a first electret material layer is formed on one of the opposed surfaces, and a first counter electrode layer is formed on another,
a top surface of the second displacement convex section and a top surface of the second fixed convex section are opposed to each other, a second electret material layer is formed on one of the opposed surfaces, and a second counter electrode layer is formed on another,
a top surface of the third displacement convex section and a top surface of the third fixed convex section are opposed to each other, a third electret material layer is formed on one of the opposed surfaces, and a third counter electrode layer is formed on another, and
a top surface of the fourth displacement convex section and a top surface of the fourth fixed convex section are opposed to each other, a fourth electret material layer is formed on one of the opposed surfaces, and a fourth counter electrode layer is formed on another.

5. The power generating element according to claim 4, wherein a stopper protrusion projecting toward the tabular structure is provided on an inner side surface of the frame-like structure, and, in a state in which the displacement member is not displaced, a predetermined gap dimension is secured between the stopper protrusion and the tabular structure.

6. The power generating element according to claim 4, wherein
the fixed member further includes an upper lid body configured to cover an upper part of the tabular structure and a lower lid body configured to cover a lower part of the tabular structure, and
in a state in which the displacement member is not displaced, a predetermined gap dimension is secured between a lower surface of the upper lid body and an upper surface of the tabular structure and a predetermined gap dimension is secured between an upper surface of the lower lid body and a lower surface of the tabular structure.

7. The power generating element according to claim 4, wherein
the tabular structure further includes a fifth displacement outer surface orthogonal to a positive region of the Z axis and a sixth displacement outer surface orthogonal to a negative region of the Z axis,
the fixed member further includes an upper lid body configured to cover an upper part of the tabular structure and a lower lid body configured to cover a lower part of the tabular structure,
a lower surface of the upper lid body forms a fifth fixed inner surface orthogonal to the positive region of the Z axis and opposed to the fifth displacement outer surface and an upper surface of the lower lid body forms a sixth fixed inner surface orthogonal to the negative region of the Z axis and opposed to the sixth displacement outer surface, and
a fifth electret material layer is formed on one of the fifth displacement outer surface and the fifth fixed inner surface, a fifth counter electrode layer is formed on another, a sixth electret material layer is formed on one of the sixth displacement outer surface and the sixth fixed inner surface, and a sixth counter electrode layer is formed on another.

8. The power generating element according to claim 4, wherein
the tabular structure is formed in a rectangular shape, and displacement support points are provided in four places corresponding to four vertexes of the rectangular shape, and
the frame-like structure is formed in a rectangular shape surrounding the tabular structure, fixed support points are provided in four places near four vertexes of the rectangular shape, the displacement support points and the fixed support points correspond in a one-to-one relation, and the corresponding displacement support points and fixed support points are respectively connected by individual elastic deformation bodies.

9. The power generating element according to claim 4, wherein the elastic deformation body has thickness smaller than thickness of the tabular structure and thickness of the frame-like structure and is configured by an elongated linear structure, one end of which is connected to a displacement support point provided in the tabular structure and another end of which is connected to a fixed support point provided in the frame-like structure.

10. The power generating element according to claim 9, wherein the elastic deformation body is configured by a curved or bent elongated linear structure.

11. The power generating element according to claim 1, wherein a weight is joined to an upper surface or a lower surface, or both the upper and lower surfaces of the tabular structure.

12. A power generating element comprising: a displacement member; a fixed member; and an elastic deformation body,
an electret material layer being formed on a surface of one of the displacement member and the fixed member, and a counter electrode layer opposed to the electret material layer being formed on another surface, and
when vibration energy is given to the power generating element, the displacement member being displaced with respect to the fixed member such that an interlayer distance between the electret material layer and the counter electrode layer fluctuates according to deformation of the elastic deformation body,
wherein the displacement member is configured to be capable of being displaced in at least two directions among an X axis, a Y axis, and a Z axis of an XYZ three-dimensional orthogonal coordinate system fixed with respect to the fixed member when the vibration energy is given to the power generating element,
and wherein the displacement member is configured by a tabular structure including an upper surface and a lower surface parallel to an XY plane, and the fixed member is configured by a frame-like structure disposed to surround the tabular structure,
and wherein when the XYZ three-dimensional orthogonal coordinate system is defined such that an origin is arranged in a center position of the displacement member in a state in which displacement does not occur,
the tabular structure includes a first displacement outer surface orthogonal to a positive region of the X axis, a second displacement outer surface orthogonal to a negative region of the X axis, a third displacement outer surface orthogonal to a positive region of the Y axis, and a fourth displacement outer surface orthogonal to a negative region of the Y axis, and
the frame-like structure includes a first fixed inner surface orthogonal to the positive region of the X axis and opposed to the first displacement outer surface, a second fixed inner surface orthogonal to the negative region of the X axis and opposed to the second displacement outer surface, a third fixed inner surface orthogonal to the positive region of the Y axis and opposed to the third displacement outer surface, and a fourth fixed inner surface orthogonal to the negative region of the Y axis and opposed to the fourth displacement outer surface,
and wherein a first displacement convex section projecting in an X-axis positive direction is provided on the first displacement outer surface,
a second displacement convex section projecting in an X-axis negative direction is provided on the second displacement outer surface,
a third displacement convex section projecting in a Y-axis positive direction is provided on the third displacement outer surface,
a fourth displacement convex section projecting in a Y-axis negative direction is provided on the fourth displacement outer surface,
a first fixed concave section configured to house the first displacement convex section is provided on the first fixed inner surface,
a second fixed concave section configured to house the second displacement convex section is provided on the second fixed inner surface,
a third fixed concave section configured to house the third displacement convex section is provided on the third fixed inner surface,
a fourth fixed concave section configured to house the fourth displacement convex section is provided on the fourth fixed inner surface,
a top surface and a side surface of the first displacement convex section and a bottom surface and a side surface of the first fixed concave section are opposed to each other, a first electret material layer is formed on one of the opposed surfaces, and a first counter electrode layer is formed on another, a top surface and a side surface of the second displacement convex section and a bottom surface and a side surface of the second fixed concave section are opposed to each other, a second electret material layer is formed on one of the opposed surfaces, and a second counter electrode layer is formed on another, a top surface and a side surface of the third displacement convex section and a bottom surface and a side surface of the third fixed concave section are opposed to each other, a third electret material layer is formed on one of the opposed surfaces, and a third counter electrode layer is formed on another, and a top surface and a side surface of the forth displacement convex section and a bottom surface and a side surface of the fourth fixed concave section are opposed to each other, a fourth electret material layer is formed on one of the opposed surfaces, and a fourth counter electrode layer is formed on another.

13. The power generating element according to claim 12, wherein the top surface of the first displacement convex section and the bottom surface of the first fixed concave section are opposed to each other, the first electret material layer is formed on one of the opposed surfaces, and a first end counter electrode layer is formed on another, a left side surface of the first displacement convex section and a left side surface of the first fixed concave section are opposed to each other, the first electret material layer is formed on one of the opposed surfaces, and a first left side counter electrode layer is formed on another, a right side surface of the first displacement convex section and a right side surface of the first fixed concave section are opposed to each other, the first electret material layer is formed on one of the opposed surfaces, and a first right side counter electrode layer is formed on another, the top surface of the second displacement convex section and the bottom surface of the second fixed concave section are opposed to each other, the second electret material layer is formed on one of the opposed surfaces, and a second end counter electrode layer is formed on another, a left side surface of the second displacement convex section and a left side surface of the second fixed concave section are opposed to each other, the second electret material layer is formed on one of the opposed surfaces, and a second left side counter electrode layer is formed on another, a right side surface of the second displacement convex section and a right side surface of the second fixed concave section are opposed to each other, the second electret material layer is formed on one of the opposed surfaces, and a second right side counter electrode layer is formed on another, the top surface of the third displacement convex section and the bottom surface of the third fixed concave section are opposed to each other, the third electret material layer is formed on one of the opposed surfaces, and a third end counter electrode layer is formed on another, a left side surface of the third displacement convex section and a left side surface of the third fixed concave section are opposed to each other, the third electret material layer is formed on one of the opposed surfaces, and a third left side counter electrode layer is formed on another, a right side surface of the third displacement convex section and a right side surface of the third fixed concave section are opposed to each other, the third electret material layer is formed on one of the opposed surfaces, and a third right side counter electrode layer is formed on another, the top surface of the fourth displacement convex section and the bottom surface of the fourth fixed concave section are opposed to each other, the fourth electret material layer is formed on one of the opposed surfaces, and a fourth end counter electrode layer is formed on another, a left side surface of the fourth displacement convex section and a left side surface of the fourth fixed concave section are opposed to each other, the fourth electret material layer is formed on one of the opposed surfaces, and a fourth left side counter electrode layer is formed on another, a right side surface of the fourth displacement convex section and a right side surface of the fourth fixed concave section are opposed to each other, the fourth electret material layer is formed on one of the opposed surfaces, and a fourth right side counter electrode layer is formed on another, and the first to fourth end counter electrode layers, the first to fourth left side counter electrode layers, and the first to fourth right side counter electrode layers form individual electrode layers electrically independent from one another.

14. A power generating element comprising: a displacement member; a fixed member; and an elastic deformation body, an electret material layer being formed on a surface of one of the displacement member and the fixed member, and a counter electrode layer opposed to the electret material layer being formed on another surface, and when vibration energy is given to the power generating element, the displacement member being displaced with respect to the fixed member such that an interlayer distance between the electret material layer and the counter electrode layer fluctuates according to deformation of the elastic deformation body, wherein the displacement member is configured to be capable of being displaced in at least two directions among an X axis, a Y axis, and a Z axis of an XYZ three-dimensional orthogonal coordinate system fixed with respect to the fixed member when the vibration energy is given to the power generating element, and wherein the displacement member is configured by a tabular structure including an upper surface and a lower surface parallel to an XY plane, and the fixed member is configured by a frame-like structure disposed to surround the tabular structure, and wherein when the XYZ three-dimensional orthogonal coordinate system is defined such that an origin is arranged in a center position of the displacement member in a state in which displacement does not occur, the tabular structure includes a first displacement outer surface orthogonal to a positive region of the X axis, a second displacement outer surface orthogonal to a negative region of the X axis, a third displacement outer surface orthogonal to a positive region of the Y axis, and a fourth displacement outer surface orthogonal to a negative region of the Y axis, and the frame-like structure includes a first fixed inner surface orthogonal to the positive region of the X axis and opposed to the first displacement outer surface, a second fixed inner surface orthogonal to the negative region of the X axis and opposed to the second displacement outer surface, a third fixed inner surface orthogonal to the positive region of the Y axis and opposed to the third displacement outer surface, and a fourth fixed inner surface orthogonal to the negative region of the Y axis and opposed to the fourth displacement outer surface, and wherein a first fixed convex section projecting in an X-axis negative direction is provided on the first fixed inner surface, a second fixed convex section projecting in an X-axis positive direction is provided on the second fixed inner surface, a third fixed convex section projecting in a Y-axis negative direction is provided on the third fixed inner surface, a fourth fixed convex section projecting in a Y-axis positive direction is provided on the fourth fixed inner surface, a first displacement concave section configured to house the first fixed convex section is provided on the first displacement outer surface, a second displacement concave section configured to house the second fixed convex section is provided on the second displacement outer surface, a third displacement concave section configured to house the third fixed convex section is provided on the third displacement outer surface, a fourth displacement concave section configured to house the fourth fixed convex section is provided on the fourth displacement outer surface, the top surface and the side surface of the first fixed convex section and the bottom surface and the side surface of the first displacement concave section are opposed to each other, a first electret material layer is formed on one of the opposed surfaces, and a first counter electrode layer is formed on another, the top surface and the side surface of the second fixed convex section and the bottom surface and the side surface of the second displacement concave section are opposed to each other, a second electret material layer is formed on one of the opposed surfaces, and a second counter electrode layer is formed on another, the top surface and the side surface of the third fixed convex section and the bottom surface and the side surface of the third displacement concave section are opposed to each other, a third electret material layer is formed on one of the opposed surfaces, and a third counter electrode layer is formed on another, and the top surface and the side surface of the fourth fixed convex section and the bottom surface and the side surface of the fourth displacement concave section are opposed to each other, a fourth electret material layer is formed on one of the opposed surfaces, and a fourth counter electrode layer is formed on another.

15. The power generating element according to claim 14, wherein the top surface of the first fixed convex section and the bottom surface of the first displacement concave section are opposed to each other, the first electret material layer is formed on one of the opposed surfaces, and a first end counter electrode layer is formed on another, a left side surface of the first fixed convex section and a left side surface of the first displacement concave section are opposed to each other, the first electret material layer is formed on one of the opposed surfaces, and a first left side counter electrode layer is formed on another, a right side surface of the first fixed convex section and a right side surface of the first displacement concave section are opposed to each other, the first electret material layer is formed on one of the opposed surfaces, and a first right side counter electrode layer is formed on another, the top surface of the second fixed convex section and the bottom surface of the second displacement concave section are opposed to each other, the second electret material layer is formed on one of the opposed surfaces, and a second end counter electrode layer is formed on another, a left side surface of the second fixed convex section and a left side surface of the second displacement concave section are opposed to each other, the second electret material layer is formed on one of the opposed surfaces, and a second left side counter electrode layer is formed on another, a right side surface of the second fixed convex section and a right side surface of the second displacement concave section are opposed to each other, the second electret material layer is formed on one of the opposed surfaces, and a second right side counter electrode layer is formed on another, the top surface of the third fixed convex section and the bottom surface of the third displacement concave section are opposed to each other, the third electret material layer is formed on one of the opposed surfaces, and a third end counter electrode layer is formed on another, a left side surface of the third fixed convex section and a left side surface of the third displacement concave section are opposed to each other, the third electret material layer is formed on one of the opposed surfaces, and a third left side counter electrode layer is formed on another, a right side surface of the third fixed convex section and a right side surface of the third displacement concave section are opposed to each other, the third electret material layer is formed on one of the opposed surfaces, and a third right side counter electrode layer is formed on another, the top surface of the fourth fixed convex section and the bottom surface of the fourth displacement concave section are opposed to each other, the fourth electret material layer is formed on one of the opposed surfaces, and a fourth end counter electrode layer is formed on another, a left side surface of the fourth fixed convex section and a left side surface of the fourth displacement concave section are opposed to each other, the fourth electret material layer is formed on one of the opposed surfaces, and a fourth left side counter electrode layer is formed on another, a right side surface of the fourth fixed convex section and a right side surface of the fourth displacement concave section are opposed to each other, the fourth electret material layer is formed on one of the opposed surfaces, and a fourth right side counter electrode layer is formed on another, and the first to fourth end counter electrode layers, the first to fourth left side counter electrode layers, and the first to fourth right side counter electrode layers form individual electrode layers electrically independent from one another.

* * * * *